US008149755B2

(12) United States Patent
Song et al.

(10) Patent No.: US 8,149,755 B2
(45) Date of Patent: Apr. 3, 2012

(54) DIGITAL BROADCASTING SYSTEM AND METHOD OF PROCESSING DATA IN DIGITAL BROADCASTING SYSTEM

(75) Inventors: Jae Hyung Song, Seoul (KR); In Hwan Choi, Gyeonggi-do (KR); Jong Yeul Suh, Seoul (KR); Jin Pil Kim, Seoul (KR); Choon Lee, Seoul (KR); Chul Soo Lee, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 13/189,211

(22) Filed: Jul. 22, 2011

(65) Prior Publication Data

US 2011/0280343 A1 Nov. 17, 2011

Related U.S. Application Data

(63) Continuation of application No. 12/198,025, filed on Aug. 25, 2008, now Pat. No. 8,014,333.

(60) Provisional application No. 60/957,714, filed on Aug. 24, 2007, provisional application No. 60/974,084, filed on Sep. 21, 2007, provisional application No. 60/977,379, filed on Oct. 4, 2007, provisional application No. 61/044,504, filed on Apr. 13, 2008, provisional application No. 61/059,811, filed on Jun. 9, 2008, provisional application No. 61/076,686, filed on Jun. 29, 2008.

(30) Foreign Application Priority Data

Aug. 25, 2008 (KR) .................. 10-2008-0082929

(51) Int. Cl.
*H04H 20/71* (2008.01)
(52) U.S. Cl. ......... 370/312; 370/329; 375/301; 375/321
(58) Field of Classification Search .................. 370/310, 370/312, 329, 345; 375/301, 321, 240.1, 375/240.25, 295, 316, 340; 348/723–725; 714/755, 756, 758
See application file for complete search history.

(56) References Cited

U.S. PATENT DOCUMENTS 5,754,651 A 5/1998 Blatter et al.
(Continued)

FOREIGN PATENT DOCUMENTS

EP 0996291 4/2000
(Continued)

OTHER PUBLICATIONS

European Telecommunications Standards Institute (ETSI), "Digital Video Broadcasting (DVB); IP Datacast over DVB-H: Program Specific Information (PSI)/Service Information (SI)," ETSI TS 102 470, Version 1.1.1, Apr. 2006.
(Continued)

*Primary Examiner* — Jung Park
(74) *Attorney, Agent, or Firm* — Lee, Hong, Degerman, Kang & Waimey

(57) ABSTRACT

A digital broadcast system and a method of processing data disclose. A receiving system of the digital broadcast system may include a baseband processor, a management processor, and a presentation processor. The baseband processor receives broadcast signals including mobile service data and main service data. The mobile service data configures a RS frame, and the RS frame includes the mobile service data and at least one type of channel setting information on the mobile service data. The management processor decodes the RS frame to acquire the mobile service data and the at least one type of channel setting information on the mobile service data, then extracts position information of an SDP message. Herein, the SDP message includes Codec information for each component in the respective virtual channel from the channel setting information, thereby accessing the SDP message from the extracted position information and gathers SDP message information. The presentation processor decodes mobile service data of a corresponding component based upon the gathered SDP message information.

10 Claims, 30 Drawing Sheets

U.S. PATENT DOCUMENTS

| | | | |
|---|---|---|---|
| 2005/0166244 A1 | 7/2005 | Moon | |
| 2006/0072623 A1 | 4/2006 | Park | |
| 2006/0126668 A1 | 6/2006 | Kwon et al. | |
| 2006/0140301 A1* | 6/2006 | Choi et al. | 375/270 |
| 2006/0184965 A1 | 8/2006 | Lee et al. | |
| 2007/0071110 A1* | 3/2007 | Choi et al. | 375/240.27 |
| 2007/0101352 A1 | 5/2007 | Rabina et al. | |
| 2007/0121681 A1* | 5/2007 | Kang et al. | 370/535 |
| 2009/0028080 A1* | 1/2009 | Song et al. | 370/310 |
| 2009/0052580 A1 | 2/2009 | Song et al. | |
| 2009/0235141 A1* | 9/2009 | Shelby et al. | 714/751 |

FOREIGN PATENT DOCUMENTS

| | | |
|---|---|---|
| EP | 1628420 | 2/2006 |
| EP | 1768396 | 3/2007 |
| JP | 11-069253 | 3/1999 |
| JP | 2001-54031 | 2/2001 |
| JP | 2002-141877 | 5/2002 |
| JP | 2003-134117 | 5/2003 |
| JP | 2004-129126 | 4/2004 |
| JP | 2007-096403 | 4/2007 |
| KR | 10-2001-0022306 | 3/2001 |
| KR | 10-2003-0030175 | 4/2003 |
| KR | 10-2003-0037138 | 5/2003 |
| KR | 1020040032282 | 4/2004 |
| KR | 1020040032283 | 4/2004 |
| KR | 10-2005-0062867 | 6/2005 |
| KR | 1020050066954 | 6/2005 |
| KR | 1020050072988 | 7/2005 |
| KR | 10-2005-0117314 | 12/2005 |
| KR | 1020050118206 | 12/2005 |
| KR | 10-2006-0012510 | 2/2006 |
| KR | 10-2006-0013999 | 2/2006 |
| KR | 10-2006-0063867 | 6/2006 |
| KR | 10-2006-0070665 | 6/2006 |
| KR | 1020060133011 | 12/2006 |
| KR | 1020070015810 | 2/2007 |
| KR | 1020070030739 | 3/2007 |
| KR | 1020070055671 | 5/2007 |
| KR | 1020070068960 | 7/2007 |
| KR | 1020070075549 | 7/2007 |
| WO | 01/28246 | 4/2001 |
| WO | 03/017254 | 2/2003 |
| WO | 03/049449 | 6/2003 |
| WO | 2004/057873 | 7/2004 |
| WO | 2004/066652 | 8/2004 |
| WO | 2005/032034 | 4/2005 |

OTHER PUBLICATIONS

Digital Video Broadcasting (DVB), "DVB-H Implementation Guidelines," DVB Document A092, Revision 2, May 2007.

European Telecommunications Standards Institute (ETSI), "Radio Broadcasting Systems; Digital Audio Broadcasting (DAB) to Mobile, Portable and Fixed Receivers," ETSI EN 300 401, Version 1.4.1, Jun. 2006.

European Telecommunications Standards Institute (ETSI), "Digital Audio Broadcasting (DAB); Internet Protocol (IP) Datagram Tunnelling," ETSI EN 201 735, Version 1.1.1, Sep. 2000.

* cited by examiner

FIG. 15

| Syntax | # of bits |
|---|---|
| FIC_Segment () { | |
|   FIC_type | 2 |
|   Reserved | 5 |
|   error_indicator | 1 |
|   FIC_seg_number | 4 |
|   FIC_last_seg_number | 4 |
|   for (i=0:i<N:i++) { | |
|     data_byte | 8 |
|   } | |
| } | |

FIG. 16

| | Syntax | # of bits |
|---|---|---|
| A first region | if (FIC_seg_number == 0) { | |
| |   current_next_indicator | 1 |
| |   Reserved | 2 |
| |   ESG_version | 5 |
| |   transport_stream_id | 16 |
| | } | |
| A second region | while ( ensemble_id != 0xFF ) | |
| |   ensemble_id | 8 |
| |   reserved | 3 |
| |   SI_version | 5 |
| |   num_channel | 3 |
| A third region |   for (i=0:i< num_channel:i++) { | |
| |     channel_type | 5 |
| |     channel_activity | 2 |
| |     CA_indicator | 1 |
| |     Stand_alone_Service_indicator | |
| |     major_channel_num | 8 |
| |     minor_channel_num | 8 |
| |   } | |
| | } // end of while | |
| | } | |

FIG. 17

| Syntax | No. of Bits | Format |
|---|---|---|
| service_map_table_section() { | | |
|   table_id | 8 | TBD |
|   section_syntax_indicator | 1 | '0' |
|   private_indicator | 1 | '1' |
|   reserved | 2 | '11' |
|   section_length | 12 | uimsbf |
|   reserved | 3 | '111' |
|   version_number | 5 | uimsbf |
|   section_number | 8 | uimsbf |
|   last_section_number | 8 | uimsbf |
|   SMT_protocol_version | 8 | uimsbf |
|   ensemble_id | 8 | uimsbf |
|   num_channels | 8 | uimsbf |
|   for (i=0; i<num_channels; i++) | | |
|   { | | |
|     major_channel_number | 8 | uimsbf |
|     minor_channel_number | 8 | uimsbf |
|     short_channel_name | 8*8 | |
|     service_id | 16 | uimsbf |
|     service_type | 6 | uimsbf |
|     virtual_channel_activity | 2 | uimsbf |
|     num_components | 5 | uimsbf |
|     IP_version_flag | 1 | bslbf |
|     source_IP_address_flag | 1 | bslbf |
|     virtual_channel_target_IP_address_flag | 1 | bslbf |
|     if (source_IP_address_flag) | | |
|       source_IP_address | 32 or 128 | uimsbf |
|     if (virtual_channel_target_IP_address_flag) | | |
|       virtual_channel_target_IP_address | 32 or 128 | uimsbf |
|     for (j=0; j<num_components; j++) | | |
|     { | | |
|       RTP_payload_type | 7 | uimsbf |
|       component_target_IP_address_flag | 1 | bslbf |
|       if (component_target_IP_address_flag) | | |
|         component_target_IP_address | 32 or 128 | uimsbf |
|       reserved | 2 | '11' |
|       port_num_count | 6 | uimsbf |
|       target_UDP_port_num | 16 | uimsbf |
|       descriptors_length | 8 | uimsbf |
|       for (k=0; k<descriptors_length; k++) | | |
|       { | | |
|         component_level_descriptor() | | |
|       } | | |
|     } | | |
|     descriptors_length | 8 | uimsbf |
|     for (m=0; m<descriptors_length; m++) | | |
|     { | | |
|       virtual_channel_level_descriptor() | | |
|     } | | |
|   } | | |
|   descriptors_length | 8 | uimsbf |
|   for (n=0; n<descriptors_length; n++) { | | |
|   { | | |
|     ensemble_level_descriptor() | | |
|   } ensemble_level_descriptor() | | |
| } | | |

FIG. 18

| Syntax | No. of Bits | Format |
|---|---|---|
| MH_audio_descriptor() { <br>     descriptor_tag <br>     descriptor_length <br>     channel_configuration <br>     reserved <br>     sample_rate_code <br>     reserved <br>     bit_rate_code <br>     ISO_639_language_code <br> } | <br> 8 <br> 8 <br> 8 <br> 5 <br> 3 <br> 2 <br> 6 <br> 3*8 | <br> TBD <br> uimsbf <br> uimsbf <br> '11111' <br> uimsbf <br> '11' <br> uimsbf <br> uimsbf |

FIG. 19

| Syntax | No. of Bits | Format |
|---|---|---|
| MH_RTP_payload_type_descriptor() { <br>     descriptor_tag <br>     descriptor_length <br>     reserved <br>     RTP_payload_type <br>     MIME_type_length <br>     MIME_type() <br> } | <br> 8 <br> 8 <br> 1 <br> 7 <br> 8 <br> var | <br> TBD <br> uimsbf <br> '1' <br> uimsbf <br> uimsbf |

FIG. 20

| Syntax | No. of Bits | Format |
|---|---|---|
| MH_current_event_descriptor() { <br>     descriptor_tag <br>     descriptor_length <br>     current_event_start_time <br>     current_event_duration <br>     Title_length <br>     Title_text() <br> } | <br> 8 <br> 8 <br> 4*8 <br> 3*8 <br> 8 <br> var | <br> TBD <br> uimsbf <br> uimsbf <br> uimsbf <br> uimsbf |

FIG. 21

| Syntax | No. of Bits | Format |
|---|---|---|
| MH_next_event_descriptor() { <br>     descriptor_tag <br>     descriptor_length <br>     next_event_start_time <br>     next_event_duration <br>     title_length <br>     title_text() <br> } | <br> 8 <br> 8 <br> 4*8 <br> 3*8 <br> 8 <br> var | <br> TBD <br> uimsbf <br> uimsbf <br> uimsbf <br> uimsbf |

FIG. 22

| Syntax | No. of Bits | Format |
|---|---|---|
| MH_system_time_descriptor() { <br>     descriptor_tag <br>     descriptor_length <br>     system_time <br>     GPS_UTC_offset <br>     time_zone_offset_polarity_rate_code <br>     time_zone_offset <br>     daylight_savings() <br>     time_zone() <br> } | <br> 8 <br> 8 <br> 32 <br> 8 <br> 1 <br> 31 <br> 16 <br> 5*8 | <br> TBD <br> uimsbf <br> uimsbf <br> uimsbf <br> bslbf <br> uimsbf <br> uimsbf |

FIG. 27

| Syntax | # of bits |
|---|---|
| Service_Map_Table_section () { | |
|     table_id | 8 |
|     section_syntax_indicator | 1 |
|     private_indicator | 1 |
|     reserved | 2 |
|     section_length | 12 |
|     reserved | 2 |
|     version_number | 5 |
|     section_number | 8 |
|     last_section_number | 8 |
|     ensemble_id | 8 |
|     num_channels | 8 |
|     for (i = 0; i<cum_channels; i++) { | |
|         transport_stream_ID | 16 |
|         major_channel_number | 8 |
|         minor_channel_number | 8 |
|         source_id | 16 |
|         short_channel_name | 7*16 |
|         descriptor_length | 8 |
|         for (j=0; j<N; j++) { | |
|         descriptor () | |
|         } | |
|     } | |
|     additional_descriptors_length | 8 |
|     for (k=0; k<N; k++) { | |
|         additional_descriptor() | |
|     } | |
| } | |

FIG. 28

| Syntax | # of bits |
|---|---|
| SDP_Reference_Descriptor () { | |
|     descriptor_tag | 8 |
|     descriptor_length | 8 |
|     Reserved | 7 |
|     SDP_Reference_Type | 1 |
|     if (SDP_Reference_Type = "SAP Stream") { | 32 or 128 |
|         Address_Type | 4 |
|         Address_Count | 4 |
|         Target_IP_Address | 32 or 128 |
|         Target_Port_Num | 8 |
|         Port_Count | 8 |
|         SDP_Session_ID | 32 |
|     } | |
|     else if (SDP_Reference_Type = "FLUTE File Delivery") { | 4 |
|         TSI_length | 2 |
|         Address_Type | 1 |
|         Address_Count | 5 |
|         Transport_Session_ID | 16 or 32 or 48 |
|         Target_IP_Address | 32 or 128 |
|         Target_Port_Num | 8 |
|         Port_count | 8 |
|         SDP_Session_ID | 32 |
|     } | |
| } | |

FIG. 29

| Syntax | # of bits |
|---|---|
| Session_Description_Descriptor () { | |
|     descriptor_tag | 8 |
|     descriptor_length | 8 |
|     Session_Version | 7 |
|     Address_Type | 1 |
|     Target_IP_address | 32 or 128 |
|     Address_Count | 4 |
|     Num_Components | 4 |
|     for (i=0; i<Num_Components; i++) { | |
|       Media_type | 4 |
|       Num_Ports | 4 |
|       Target_Port_Number | 8 |
|       RTP_Payload_type | 5 |
|       Codec_type | 3 |
|       MPEG4_ES_ID | 8 |
|       if (Media_type == "Video" && Codec_type == "H.264") | |
|         AVC_Video_Description_Bytes() | |
|       else if (Media_type = "Video" && Codec_type = "SVC") { | |
|         AVC_Video_Description_Bytes() | |
|         Hierarchy_Description_Bytes() | |
|         SVC_extension_Description_Bytes() | |
|       } | |
|       else if (Media_type = "Audio") | |
|         MPEG4_Audio_Description_Bytes() | |
|     } | |
| } | |

FIG. 30

| Syntax | # of bits |
|---|---|
| AVC_Video_Description_Bytes () { | |
|     profile_idc | 8 |
|     constraint_set0_flag | 1 |
|     constraint_set1_flag | 1 |
|     constraint_set2_flag | 1 |
|     constraint_set3_flag | 1 |
|     AVC_compatible_flags | 4 |
|     level_idc | 8 |
|     AVC_still_present | 1 |
|     AVC_24_hour_picture_flag | 1 |
|     Reserved | 6 |
| } | |

FIG. 31

| Syntax | # of bits |
|---|---|
| Hierarchy_Description_Bytes() { | |
|   Reserved | 1 |
|   temporal_scalability_flag | 1 |
|   spatial_scalability_flag | 1 |
|   quality_scalability_flag | 1 |
|   hierarchy_type | 4 |
|   Reserved | 2 |
|   hierarchy_layer_index | 6 |
|   Reserved | 2 |
|   hierarchy_embedded_layer_index | 6 |
|   Reserved | 2 |
|   hierarchy_channel | 6 |
| } | |

FIG. 32

| Syntax | # of bits |
|---|---|
| SVC_extension_Description_Bytes() { <br>   profile_idc <br>   level_idc <br>   width <br>   height <br>   frame_rate <br>   average_bitrate <br>   maximum_bitrate <br>   dependency_id <br>   Reserved <br>   quality_id_start <br>   quality_id_end <br>   temporal_id_start <br>   temporal_id_end <br>   Reserved <br> } | <br> 1 <br> 1 <br> 1 <br> 1 <br> 1 <br> 1 <br> 4 <br> 2 <br> 6 <br> 2 <br> 6 <br> 2 <br> 6 <br> |

FIG. 33

| Syntax | # of bits |
|---|---|
| MPGE 4_Audio_Description_Bytes() { <br>     MPEG 4_audio_profile_and_level <br> } | <br> 8 |

DIGITAL BROADCASTING SYSTEM AND METHOD OF PROCESSING DATA IN DIGITAL BROADCASTING SYSTEM

This application is a continuation of U.S. application Ser. No. 12/198,025, filed on Aug. 25, 2008, now U.S. Pat. No. 8,014,333 issued on Sep. 6, 2011, which claims the benefit of U.S. Provisional Patent Application No. 60/957,714, filed on Aug. 24, 2007, U.S. Provisional Patent Application No. 60/974,084, filed on Sep. 21, 2007, U.S. Provisional Patent Application No. 60/977,379, filed on Oct. 4, 2007, U.S. Provisional Patent Application No. 61/044,504, filed on Apr. 13, 2008, U.S. Provisional Patent Application No. 61/059,811, filed on Jun. 9, 2008, U.S. Provisional Patent Application No. 61/076,686, filed on Jun. 29, 2008 and Korean Patent Application No. 10-2008-0082929, filed on Aug. 25, 2008, which are all hereby incorporated by reference as if fully set forth herein.

BACKGROUND OF THE INVENTION

1. Field of the Invention

The present invention relates to a digital broadcasting system and a method of processing data in a digital broadcasting system for transmitting and receiving digital broadcast signals.

2. Discussion of the Related Art

The Vestigial Sideband (VSB) transmission mode, which is adopted as the standard for digital broadcasting in North America and the Republic of Korea, is a system using a single carrier method. Therefore, the receiving performance of the digital broadcast receiving system may be deteriorated in a poor channel environment. Particularly, since resistance to changes in channels and noise is more highly required when using portable and/or mobile broadcast receivers, the receiving performance may be even more deteriorated when transmitting mobile service data by the VSB transmission mode.

SUMMARY OF THE INVENTION

Accordingly, an object of the present invention is to provide a digital broadcasting system and a data processing method that are highly resistant to channel changes and noise.

Another object of the present invention is to provide a receiving system and a data processing method that is capable of acquiring session description protocol (SDP) information, when a session description protocol (SDP) message for each virtual channel exists, by receiving position information of the corresponding SDP message via signaling information.

A further object of the present invention is to provide a receiving system and a data processing method that is capable of receiving internet protocol (IP) access information and description information corresponding to each component for each respective virtual channel via signaling information.

To achieve these objects and other advantages and in accordance with the purpose of the invention, as embodied and broadly described herein, a receiving system includes a baseband processor, a management processor, and a presentation processor. The baseband processor receives broadcast signals including mobile service data and main service data. Herein, the mobile service data may configure a Reed-Solomon (RS) frame, and the RS frame may include the mobile service data and at least one type of channel setting information on the mobile service data. The management processor decodes the RS frame so as to acquire the mobile service data and the at least one type of channel setting information on the mobile service data. The management processor then extracts position information of a session description protocol (SDP) message. Herein, the SDP message includes Codec information for each component in the respective virtual channel from the channel setting information. Accordingly, the management processor accesses the SDP message from the extracted position information and gathers SDP message information. The presentation processor decodes mobile service data of a corresponding component based upon the gathered SDP message information.

The baseband processor may further include a known sequence detector detecting known data sequences included in at least one data group, the data group configuring the RS frame. Herein, the detected known data sequence may be used for demodulation and channel equalization of the mobile service data.

The channel setting information may correspond to a service map table (SMT), and the SDP position information may be included in the SMT in a descriptor format, so as to be received.

When an SDP reference type included in the SDP position information indicates that the SDP message is being received in a session announcement protocol (SAP) stream format, the management processor may access an SAP stream so as to gather SDP message information from the SDP position information.

Alternatively, when an SDP reference type included in the SDP position information indicates that the SDP message is being received in an SDP file format through a file delivery over unidirectional transport (FLUTE) session, the management processor may access a FLUTE session so as to gather SDP message information from the SDP position information.

According to another aspect of the present invention, a method for processing data in a receiving system includes receiving broadcast signals including mobile service data and main service data, wherein the mobile service data is capable of configuring an RS frame, and wherein the RS frame includes the mobile service data and at least one type of channel setting information on the mobile service data, decoding the RS frame so as to acquire the mobile service data and the at least one type of channel setting information on the mobile service data, extracting position information of a session description protocol (SDP) message, the SDP message including Codec information for each component in the respective virtual channel from the channel setting information, thereby accessing the SDP message from the extracted position information and gathering SDP message information, and decoding mobile service data of a corresponding component based upon the gathered SDP message information.

According to another aspect of the present invention, a receiving system includes a baseband processor, a management processor, and a presentation processor. The baseband processor receives broadcast signals including mobile service data and main service data. Herein, the mobile service data may configure a Reed-Solomon (RS) frame, and the RS frame may include the mobile service data and at least one type of channel setting information on the mobile service data. The management processor decodes the RS frame so as to acquire the mobile service data and the at least one type of channel setting information on the mobile service data. The management processor then extracts Codec information for each component in the respective virtual channel from the channel setting information. The presentation processor decodes mobile service data of a corresponding component based upon the gathered SDP message information.

Herein, the channel setting information may correspond to a service map table (SMT), and the Codec information may be included in the SMT in a descriptor format, so as to be received.

According to a further aspect of the present invention, a method for processing data in a digital broadcast receiving system includes receiving broadcast signals including mobile service data and main service data, wherein the mobile service data is capable of configuring an RS frame, and wherein the RS frame includes the mobile service data and at least one type of channel setting information on the mobile service data, decoding the RS frame so as to acquire the mobile service data and the at least one type of channel setting information on the mobile service data, extracting Codec information for each component in the respective virtual channel from the channel setting information, and decoding mobile service data of a corresponding component based upon the extracted Codec information.

Additional advantages, objects, and features of the invention may be realized and attained by the structure particularly pointed out in the written description as well as the appended drawings.

BRIEF DESCRIPTION OF THE DRAWINGS

FIG. 15 illustrates an exemplary bit stream syntax structure with respect to an FIC segment according to an embodiment of the present invention;

FIG. 16 illustrates an exemplary bit stream syntax structure with respect to a payload of an FIC segment according to the present invention, when an FIC type field value is equal to '0';

FIG. 17 illustrates an exemplary bit stream syntax structure of a service map table according to the present invention;

FIG. 18 illustrates an exemplary bit stream syntax structure of an MH audio descriptor according to the present invention;

FIG. 19 illustrates an exemplary bit stream syntax structure of an MH RTP payload type descriptor according to the present invention;

FIG. 20 illustrates an exemplary bit stream syntax structure of an MH current event descriptor according to the present invention;

FIG. 21 illustrates an exemplary bit stream syntax structure of an MH next event descriptor according to the present invention;

FIG. 22 illustrates an exemplary bit stream syntax structure of an MH system time descriptor according to the present invention;

FIG. 27 illustrates an exemplary bit stream syntax structure of a service map table (SMT) according to another embodiment of the present invention;

FIG. 28 illustrates an exemplary bit stream syntax structure of an SDP_Reference_Descriptor( ) according to the present invention;

FIG. 29 illustrates an exemplary bit stream syntax structure of a Session_Description_Descriptor( ) according to the present invention;

FIG. 30 illustrates an exemplary bit stream syntax structure of an AVC_Video_Description_Bytes( ) according to the present invention;

FIG. 31 illustrates an exemplary bit stream syntax structure of a Hierarchy_Description_Bytes( ) according to the present invention;

FIG. 32 illustrates an exemplary bit stream syntax structure of an SVC_extension_Description_Bytes( ) according to the present invention;

FIG. 33 illustrates an exemplary bit stream syntax structure of an MPEG4_Audio_Description_Bytes( ) according to the present invention.

DETAILED DESCRIPTION OF THE INVENTION

Figure 1:
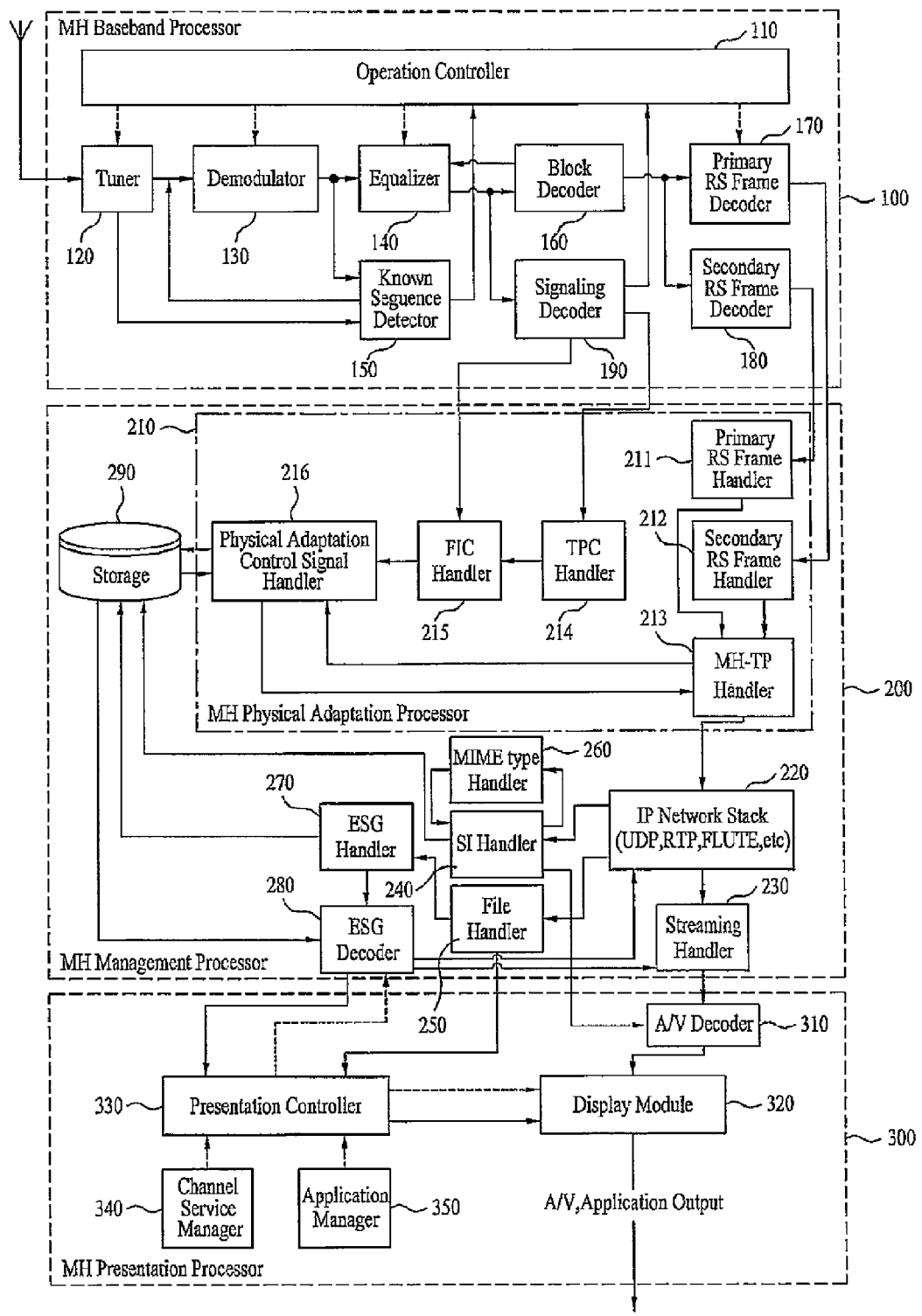
FIG. 1 illustrates a block diagram showing a general structure of a digital broadcasting receiving system according to an embodiment of the present invention.

Reference will now be made in detail to the preferred embodiments of the present invention, examples of which are illustrated in the accompanying drawings.

DEFINITION OF THE TERMS USED IN THE PRESENT INVENTION

In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

Among the terms used in the description of the present invention, main service data correspond to data that can be received by a fixed receiving system and may include audio/video (A/V) data. More specifically, the main service data may include A/V data of high definition (HD) or standard definition (SD) levels and may also include diverse data types required for data broadcasting. Also, the known data correspond to data pre-known in accordance with a pre-arranged agreement between the receiving system and the transmitting system.

Additionally, among the terms used in the present invention, "MH" corresponds to the initials of "mobile" and "handheld" and represents the opposite concept of a fixed-type system. Furthermore, the MH service data may include at least one of mobile service data and handheld service data, and will also be referred to as "mobile service data" for simplicity. Herein, the mobile service data not only correspond to MH service data but may also include any type of service data with mobile or portable characteristics. Therefore, the mobile service data according to the present invention are not limited only to the MH service data.

The above-described mobile service data may correspond to data having information, such as program execution files, stock information, and so on, and may also correspond to A/V data. Most particularly, the mobile service data may correspond to A/V data having lower resolution and lower data rate as compared to the main service data. For example, if an A/V codec that is used for a conventional main service corresponds to a MPEG-2 codec, a MPEG-4 advanced video coding (AVC) or scalable video coding (SVC) having better image compression efficiency may be used as the A/V codec for the mobile service. Furthermore, any type of data may be transmitted as the mobile service data. For example, transport protocol expert group (TPEG) data for broadcasting real-time transportation information may be transmitted as the main service data.

Also, a data service using the mobile service data may include weather forecast services, traffic information services, stock information services, viewer participation quiz programs, real-time polls and surveys, interactive education broadcast programs, gaming services, services providing information on synopsis, character, background music, and filming sites of soap operas or series, services providing information on past match scores and player profiles and achievements, and services providing information on product information and programs classified by service, medium, time, and theme enabling purchase orders to be processed. Herein, the present invention is not limited only to the services mentioned above.

In the present invention, the transmitting system provides backward compatibility in the main service data so as to be received by the conventional receiving system. Herein, the main service data and the mobile service data are multiplexed to the same physical channel and then transmitted.

Furthermore, the transmitting system according to the present invention performs additional encoding on the mobile service data and inserts the data already known by the receiving system and transmitting system (e.g., known data), thereby transmitting the processed data.

Therefore, when using the transmitting system according to the present invention, the receiving system may receive the mobile service data during a mobile state and may also receive the mobile service data with stability despite various distortion and noise occurring within the channel.

Receiving System

FIG. 1 illustrates a block diagram showing a general structure of a receiving system according to an embodiment of the present invention. The receiving system according to the present invention includes a baseband processor 100, a management processor 200, and a presentation processor 300.

The baseband processor 100 includes an operation controller 110, a tuner 120, a demodulator 130, an equalizer 140, a known sequence detector (or known data detector) 150, a block decoder (or mobile handheld block decoder) 160, a primary Reed-Solomon (RS) frame decoder 170, a secondary RS frame decoder 180, and a signaling decoder 190.

The operation controller 110 controls the operation of each block included in the baseband processor 100.

By tuning the receiving system to a specific physical channel frequency, the tuner 120 enables the receiving system to receive main service data, which correspond to broadcast signals for fixed-type broadcast receiving systems, and mobile service data, which correspond to broadcast signals for mobile broadcast receiving systems. At this point, the tuned frequency of the specific physical channel is down-converted to an intermediate frequency (IF) signal, thereby being outputted to the demodulator 130 and the known sequence detector 140. The passband digital IF signal being outputted from the tuner 120 may only include main service data, or only include mobile service data, or include both main service data and mobile service data.

The demodulator 130 performs self-gain control, carrier recovery, and timing recovery processes on the passband digital IF signal inputted from the tuner 120, thereby translating the IF signal to a baseband signal. Then, the demodulator 130 outputs the baseband signal to the equalizer 140 and the known sequence detector 150. The demodulator 130 uses the known data symbol sequence inputted from the known sequence detector 150 during the timing and/or carrier recovery, thereby enhancing the demodulating performance.

The equalizer 140 compensates channel-associated distortion included in the signal demodulated by the demodulator 130. Then, the equalizer 140 outputs the distortion-compensated signal to the block decoder 160. By using a known data symbol sequence inputted from the known sequence detector 150, the equalizer 140 may enhance the equalizing performance. Furthermore, the equalizer 140 may receive feedback on the decoding result from the block decoder 160, thereby enhancing the equalizing performance.

The known sequence detector 150 detects known data place (or position) inserted by the transmitting system from the input/output data (i.e., data prior to being demodulated or data being processed with partial demodulation). Then, the known sequence detector 150 outputs the detected known data position information and known data sequence generated from the detected position information to the demodulator 130 and the equalizer 140. Additionally, in order to allow the block decoder 160 to identify the mobile service data that have been processed with additional encoding by the transmitting system and the main service data that have not been processed with any additional encoding, the known sequence detector 150 outputs such corresponding information to the block decoder 160.

If the data channel-equalized by the equalizer 140 and inputted to the block decoder 160 correspond to data processed with both block-encoding and trellis-encoding by the transmitting system (i.e., data within the RS frame, signaling data), the block decoder 160 may perform trellis-decoding and block-decoding as inverse processes of the transmitting system. On the other hand, if the data channel-equalized by the equalizer 140 and inputted to the block decoder 160 correspond to data processed only with trellis-encoding and not block-encoding by the transmitting system (i.e., main service data), the block decoder 160 may perform only trellis-decoding.

The signaling decoder 190 decoded signaling data that have been channel-equalized and inputted from the equalizer 140. It is assumed that the signaling data inputted to the signaling decoder 190 correspond to data processed with both block-encoding and trellis-encoding by the transmitting system. Examples of such signaling data may include transmission parameter channel (TPC) data and fast information channel (FIC) data. Each type of data will be described in more detail in a later process. The FIC data decoded by the signaling decoder 190 are outputted to the FIC handler 215. And, the TPC data decoded by the signaling decoder 190 are outputted to the TPC handler 214.

Meanwhile, according to the present invention, the transmitting system uses RS frames by encoding units. Herein, the RS frame may be divided into a primary RS frame and a secondary RS frame. However, according to the embodiment of the present invention, the primary RS frame and the secondary RS frame will be divided based upon the level of importance of the corresponding data.

The primary RS frame decoder 170 receives the data outputted from the block decoder 160. At this point, according to the embodiment of the present invention, the primary RS frame decoder 170 receives only the mobile service data that have been Reed-Solomon (RS)-encoded and/or cyclic redundancy check (CRC)-encoded from the block decoder 160. Herein, the primary RS frame decoder 170 receives only the mobile service data and not the main service data. The primary RS frame decoder 170 performs inverse processes of an RS frame encoder (not shown) included in the transmitting system, thereby correcting errors existing within the primary RS frame. More specifically, the primary RS frame decoder 170 forms a primary RS frame by grouping a plurality of data groups and, then, correct errors in primary RS frame units. In other words, the primary RS frame decoder 170 decodes primary RS frames, which are being transmitted for actual broadcast services.

Additionally, the secondary RS frame decoder 180 receives the data outputted from the block decoder 160. At this point, according to the embodiment of the present invention, the secondary RS frame decoder 180 receives only the mobile service data that have been RS-encoded and/or CRC-encoded from the block decoder 160. Herein, the secondary RS frame decoder 180 receives only the mobile service data and not the main service data. The secondary RS frame decoder 180 performs inverse processes of an RS frame encoder (not shown) included in the transmitting system, thereby correcting errors existing within the secondary RS frame. More specifically, the secondary RS frame decoder 180 forms a secondary RS frame by grouping a plurality of data groups and, then, correct errors in secondary RS frame units. In other words, the secondary RS frame decoder 180 decodes secondary RS frames, which are being transmitted for mobile audio service data, mobile video service data, guide data, and so on.

Meanwhile, the management processor 200 according to an embodiment of the present invention includes an MH physical adaptation processor 210, an IP network stack 220, a streaming handler 230, a system information (SI) handler 240, a file handler 250, a multi-purpose internet main extensions (MIME) type handler 260, and an electronic service guide (ESG) handler 270, and an ESG decoder 280, and a storage unit 290.

The MH physical adaptation processor 210 includes a primary RS frame handler 211, a secondary RS frame handler 212, an MH transport packet (TP) handler 213, a TPC handler 214, an FIC handler 215, and a physical adaptation control signal handler 216.

The TPC handler 214 receives and processes baseband information required by modules corresponding to the MH physical adaptation processor 210. The baseband information is inputted in the form of TPC data. Herein, the TPC handler 214 uses this information to process the FIC data, which have been sent from the baseband processor 100.

The TPC data are transmitted from the transmitting system to the receiving system via a predetermined region of a data group. The TPC data may include at least one of an MH ensemble ID, an MH sub-frame number, a total number of MH groups (TNoG), an RS frame continuity counter, a column size of RS frame (N), and an FIC version number.

Herein, the MH ensemble ID indicates an identification number of each MH ensemble carried in the corresponding channel.

The MH sub-frame number signifies a number identifying the MH sub-frame number in an MH frame, wherein each MH group associated with the corresponding MH ensemble is transmitted.

The TNoG represents the total number of MH groups including all of the MH groups belonging to all MH parades included in an MH sub-frame.

The RS frame continuity counter indicates a number that serves as a continuity counter of the RS frames carrying the corresponding MH ensemble. Herein, the value of the RS frame continuity counter shall be incremented by 1 modulo 16 for each successive RS frame.

N represents the column size of an RS frame belonging to the corresponding MH ensemble. Herein, the value of N determines the size of each MH TP.

Finally, the FIC version number signifies the version number of an FIC carried on the corresponding physical channel.

As described above, diverse TPC data are inputted to the TPC handler 214 via the signaling decoder 190 shown in FIG. 1. Then, the received TPC data are processed by the TPC handler 214. The received TPC data may also be used by the FIC handler 215 in order to process the FIC data.

The FIC handler 215 processes the FIC data by associating the FIC data received from the baseband processor 100 with the TPC data.

The physical adaptation control signal handler 216 collects FIC data received through the FIC handler 215 and SI data received through RS frames. Then, the physical adaptation control signal handler 216 uses the collected FIC data and SI data to configure and process IP datagrams and access information of mobile broadcast services. Thereafter, the physical adaptation control signal handler 216 stores the processed IP datagrams and access information to the storage unit 290.

The primary RS frame handler 211 identifies primary RS frames received from the primary RS frame decoder 170 of the baseband processor 100 for each row unit, so as to configure an MH TP. Thereafter, the primary RS frame handler 211 outputs the configured MH TP to the MH TP handler 213.

The secondary RS frame handler 212 identifies secondary RS frames received from the secondary RS frame decoder 180 of the baseband processor 100 for each row unit, so as to configure an MH TP. Thereafter, the secondary RS frame handler 212 outputs the configured MH TP to the MH TP handler 213.

The MH transport packet (TP) handler 213 extracts a header from each MH TP received from the primary RS frame handler 211 and the secondary RS frame handler 212, thereby determining the data included in the corresponding MH TP. Then, when the determined data correspond to SI data (i.e., SI data that are not encapsulated to IP datagrams), the corresponding data are outputted to the physical adaptation control signal handler 216. Alternatively, when the determined data correspond to an IP datagram, the corresponding data are outputted to the IP network stack 220.

The IP network stack 220 processes broadcast data that are being transmitted in the form of IP datagrams. More specifically, the IP network stack 220 processes data that are inputted via user datagram protocol (UDP), real-time transport protocol (RTP), real-time transport control protocol (RTCP), asynchronous layered coding/layered coding transport (ALC/LCT), file delivery over unidirectional transport (FLUTE), and so on. Herein, when the processed data correspond to streaming data, the corresponding data are outputted to the streaming handler 230. And, when the processed data correspond to data in a file format, the corresponding data are outputted to the file handler 250. Finally, when the processed data correspond to SI-associated data, the corresponding data are outputted to the SI handler 240.

The SI handler 240 receives and processes SI data having the form of IP datagrams, which are inputted to the IP network stack 220.

When the inputted data associated with SI correspond to MIME-type data, the inputted data are outputted to the MIME-type handler 260.

The MIME-type handler 260 receives the MIME-type SI data outputted from the SI handler 240 and processes the received MIME-type SI data.

The file handler 250 receives data from the IP network stack 220 in an object format in accordance with the ALC/LCT and FLUTE structures. The file handler 250 groups the received data to create a file format. Herein, when the corresponding file includes ESG, the file is outputted to the ESG handler 270. On the other hand, when the corresponding file includes data for other file-based services, the file is outputted to the presentation controller 330 of the presentation processor 300.

The ESG handler 270 processes the ESG data received from the file handler 250 and stores the processed ESG data to the storage unit 290. Alternatively, the ESG handler 270 may output the processed ESG data to the ESG decoder 280, thereby allowing the ESG data to be used by the ESG decoder 280.

The storage unit 290 stores the system information (SI) received from the physical adaptation control signal handler 210 and the ESG handler 270 therein. Thereafter, the storage unit 290 transmits the stored SI data to each block.

The ESG decoder 280 either recovers the ESG data and SI data stored in the storage unit 290 or recovers the ESG data transmitted from the ESG handler 270. Then, the ESG decoder 280 outputs the recovered data to the presentation controller 330 in a format that can be outputted to the user.

The streaming handler 230 receives data from the IP network stack 220, wherein the format of the received data are in accordance with RTP and/or RTCP structures. The streaming handler 230 extracts audio/video streams from the received data, which are then outputted to the audio/video (A/V) decoder 310 of the presentation processor 300. The audio/video decoder 310 then decodes each of the audio stream and video stream received from the streaming handler 230.

The display module 320 of the presentation processor 300 receives audio and video signals respectively decoded by the A/V decoder 310. Then, the display module 320 provides the received audio and video signals to the user through a speaker and/or a screen.

The presentation controller 330 corresponds to a controller managing modules that output data received by the receiving system to the user.

The channel service manager 340 manages an interface with the user, which enables the user to use channel-based broadcast services, such as channel map management, channel service connection, and so on.

The application manager 350 manages an interface with a user using ESG display or other application services that do not correspond to channel-based services.

Data Format Structure

Meanwhile, the data structure used in the mobile broadcasting technology according to the embodiment of the present invention may include a data group structure and an RS frame structure, which will now be described in detail.

Figure 2:
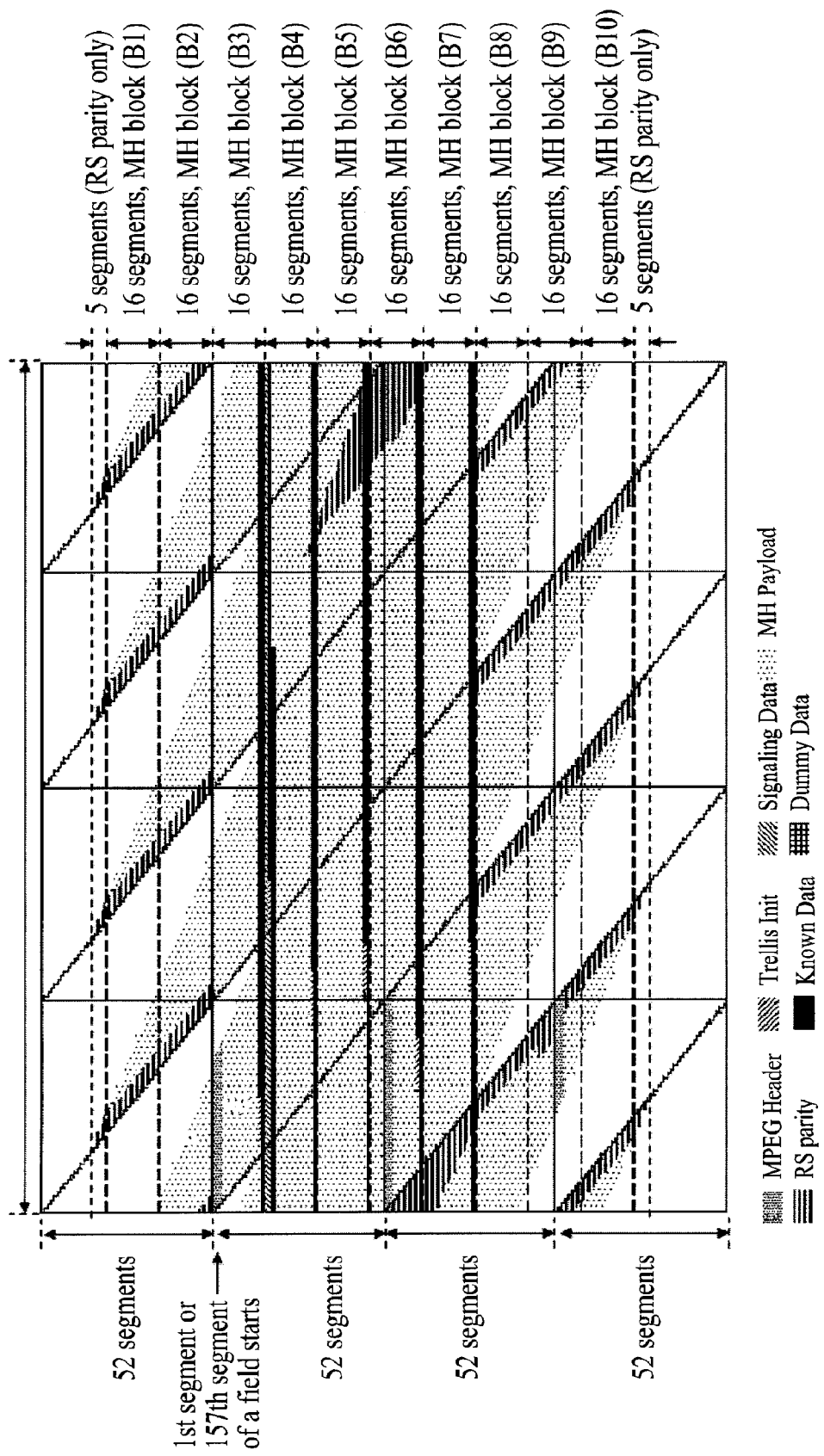
FIG. 2 illustrates an exemplary structure of a data group according to the present invention.

FIG. 2 illustrates an exemplary structure of a data group according to the present invention.

FIG. 2 shows an example of dividing a data group according to the data structure of the present invention into 10 MH blocks (i.e., MH block 1 (B1) to MH block 10 (B10)). In this example, each MH block has the length of 16 segments. Referring to FIG. 2, only the RS parity data are allocated to portions of the previous 5 segments of the MH block 1 (B1) and the next 5 segments of the MH block 10 (B10). The RS parity data are excluded in regions A to D of the data group.

More specifically, when it is assumed that one data group is divided into regions A, B, C, and D, each MH block may be included in any one of region A to region D depending upon the characteristic of each MH block within the data group. Herein, the data group is divided into a plurality of regions to be used for different purposes. More specifically, a region of the main service data having no interference or a very low interference level may be considered to have a more resistant (or stronger) receiving performance as compared to regions having higher interference levels. Additionally, when using a system inserting and transmitting known data in the data group, wherein the known data are known based upon an agreement between the transmitting system and the receiving system, and when consecutively long known data are to be periodically inserted in the mobile service data, the known data having a predetermined length may be periodically inserted in the region having no interference from the main service data (i.e., a region wherein the main service data are not mixed). However, due to interference from the main service data, it is difficult to periodically insert known data and also to insert consecutively long known data to a region having interference from the main service data.

Referring to FIG. 2, MH block 4 (B4) to MH block 7 (B7) correspond to regions without interference of the main service data. MH block 4 (B4) to MH block 7 (B7) within the data group shown in FIG. 2 correspond to a region where no interference from the main service data occurs. In this example, a long known data sequence is inserted at both the beginning and end of each MH block. In the description of the present invention, the region including MH block 4 (B4) to MH block 7 (B7) will be referred to as "region A (=B4+B5+B6+B7)". As described above, when the data group includes region A having a long known data sequence inserted at both the beginning and end of each MH block, the receiving system is capable of performing equalization by using the channel information that can be obtained from the known data. Therefore, the strongest equalizing performance may be yielded (or obtained) from one of region A to region D.

In the example of the data group shown in FIG. 2, MH block (B3) and MH block 8 (B8) correspond to a region having little interference from the main service data. Herein, a long known data sequence is inserted in only one side of each MH block B3 and B8. More specifically, due to the interference from the main service data, a long known data sequence is inserted at the end of MH block 3 (B3), and another long known data sequence is inserted at the beginning of MH block 8 (B8). In the present invention, the region including MH block 3 (B3) and MH block 8 (B8) will be referred to as "region B (=B3+B8)". As described above, when the data group includes region B having a long known data sequence inserted at only one side (beginning or end) of each MH block, the receiving system is capable of performing equalization by using the channel information that can be obtained from the known data. Therefore, a stronger equalizing performance as compared to region C/D may be yielded (or obtained).

Referring to FIG. 2, MH block 2 (B2) and MH block 9 (B9) correspond to a region having more interference from the main service data as compared to region B. A long known data sequence cannot be inserted in any side of MH block 2 (B2) and MH block 9 (B9). Herein, the region including MH block 2 (B2) and MH block 9 (B9) will be referred to as "region C (=B2+B9)".

Finally, in the example shown in FIG. 2, MH block 1 (B1) and MH block 10 (B10) correspond to a region having more interference from the main service data as compared to region C. Similarly, a long known data sequence cannot be inserted in any side of MH block 1 (B1) and MH block 10 (B10). Herein, the region including MH block 1 (B1) and MH block 10 (B10) will be referred to as "region D (=B1+B10)". Since region C/D is spaced further apart from the known data sequence, when the channel environment undergoes frequent and abrupt changes, the receiving performance of region C/D may be deteriorated.

Additionally, the data group includes a signaling information area wherein signaling information is assigned (or allocated).

In the present invention, the signaling information area may start from the $1^{st}$ segment of the $4^{th}$ MH block (B4) to a portion of the $2^{nd}$ segment. According to an embodiment of the present invention, the signaling information area for inserting signaling information may start from the $1^{st}$ segment of the $4^{th}$ MH block (B4) to a portion of the $2^{nd}$ segment.

More specifically, 276(=207+69) bytes of the $4^{th}$ MH block (B4) in each data group are assigned as the signaling information area. In other words, the signaling information area consists of 207 bytes of the $1^{st}$ segment and the first 69 bytes of the $2^{nd}$ segment of the $4^{th}$ MH block (B4). The $1^{st}$ segment of the $4^{th}$ MH block (B4) corresponds to the $17^{th}$ or $173^{rd}$ segment of a VSB field.

Herein, the signaling information may be identified by two different types of signaling channels: a transmission parameter channel (TPC) and a fast information channel (FIC).

Herein, the TPC data may include at least one of an MH ensemble ID, an MH sub-frame number, a total number of MH groups (TNoG), an RS frame continuity counter, a column size of RS frame (N), and an FIC version number. However, the TPC data (or information) presented herein are merely exemplary. And, since the adding or deleting of signaling information included in the TPC data may be easily adjusted and modified by one skilled in the art, the present invention will, therefore, not be limited to the examples set forth herein. Furthermore, the FIC is provided to enable a fast service acquisition of data receivers, and the FIC includes cross layer information between the physical layer and the upper layer(s).

For example, when the data group includes 6 known data sequences, as shown in FIG. 2, the signaling information area is located between the first known data sequence and the second known data sequence. More specifically, the first known data sequence is inserted in the last 2 segments of the 3rd MH block (B3), and the second known data sequence in inserted in the $2^{nd}$ and $3^{rd}$ segments of the $4^{th}$ MH block (B4). Furthermore, the $3^{rd}$ to $6^{th}$ known data sequences are respectively inserted in the last 2 segments of each of the $4^{th}$, $5^{th}$, $6^{th}$, and $7^{th}$ MH blocks (B4, B5, B6, and B7). The $1^{st}$ and $3^{rd}$ to $6^{th}$ known data sequences are spaced apart by 16 segments.

Figure 3:
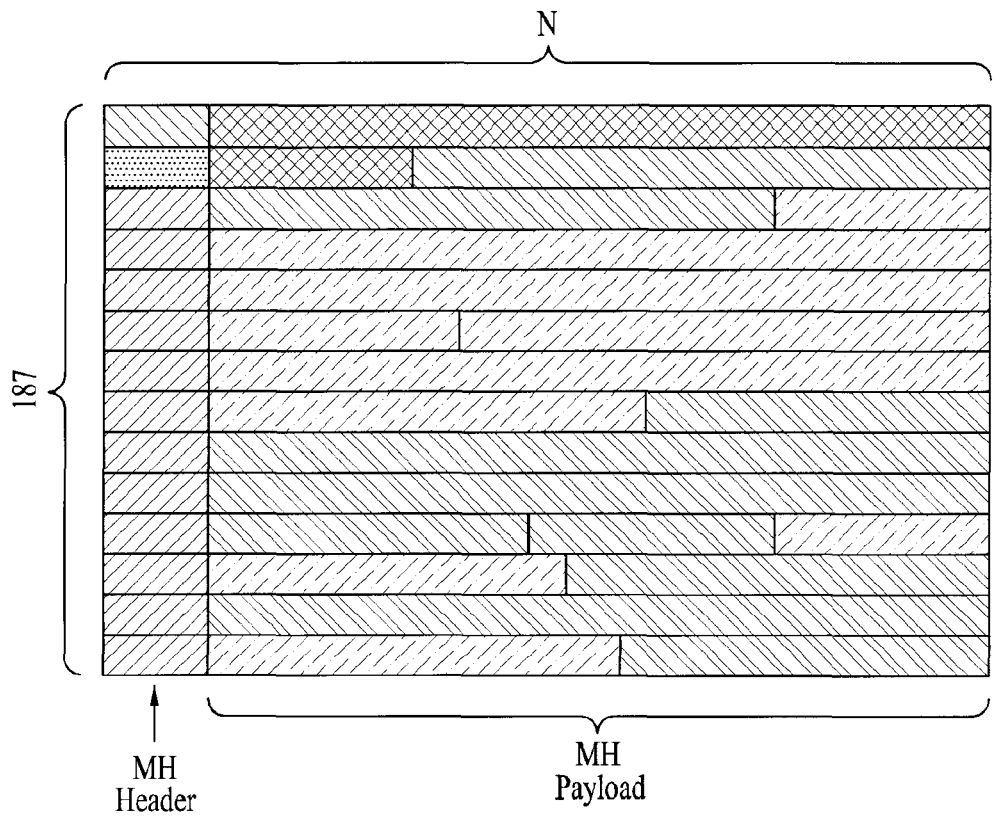
FIG. 3 illustrates an RS frame according to an embodiment of the present invention.

FIG. 3 illustrates an RS frame according to an embodiment of the present invention.

The RS frame shown in FIG. 3 corresponds to a collection of one or more data groups. The RS frame is received for each MH frame in a condition where the receiving system receives the FIC and processes the received FIC and where the receiving system is switched to a time-slicing mode so that the receiving system can receive MH ensembles including ESG entry points. Each RS frame includes IP streams of each service or ESG, and SMT section data may exist in all RS frames.

The RS frame according to the embodiment of the present invention consists of at least one MH transport packet (TP). Herein, the MH TP includes an MH header and an MH payload.

The MH payload may include mobile service data as well as signaling data. More specifically, an MH payload may include only mobile service data, or may include only signaling data, or may include both mobile service data and signaling data.

According to the embodiment of the present invention, the MH header may identify (or distinguish) the data types included in the MH payload. More specifically, when the MH TP includes a first MH header, this indicates that the MH payload includes only the signaling data. Also, when the MH TP includes a second MH header, this indicates that the MH payload includes both the signaling data and the mobile service data. Finally, when MH TP includes a third MH header, this indicates that the MH payload includes only the mobile service data.

In the example shown in FIG. 3, the RS frame is assigned with IP datagrams (IP datagram 1 and IP datagram 2) for two service types.

Data Transmission Structure

Figure 4:
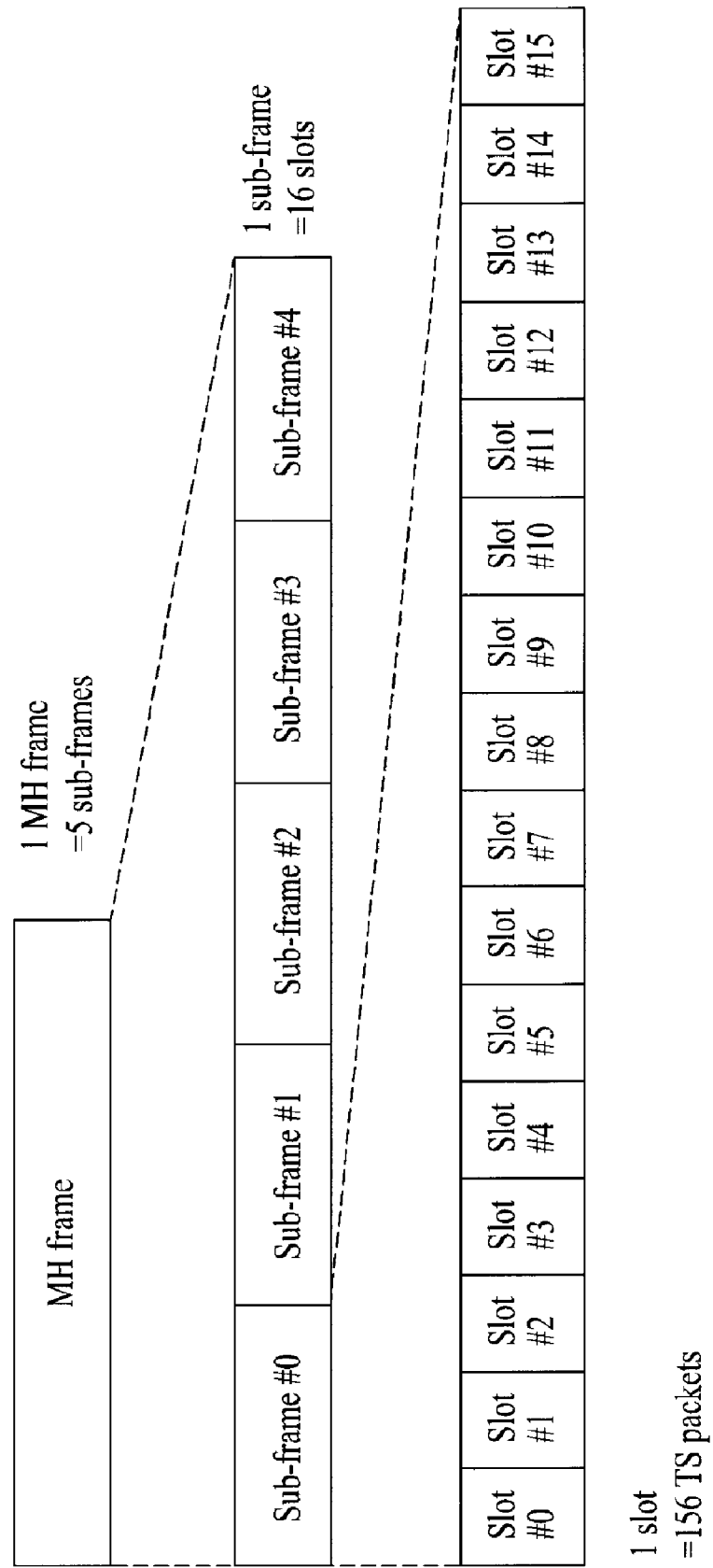
FIG. 4 illustrates an example of an MH frame structure for transmitting and receiving mobile service data according to the present invention.

FIG. 4 illustrates a structure of a MH frame for transmitting and receiving mobile service data according to the present invention. In the example shown in FIG. 4, one MH frame consists of 5 sub-frames, wherein each sub-frame includes 16 slots. In this case, the MH frame according to the present invention includes 5 sub-frames and 80 slots.

Also, in a packet level, one slot is configured of 156 data packets (i.e., transport stream packets), and in a symbol level, one slot is configured of 156 data segments. Herein, the size of one slot corresponds to one half (½) of a VSB field. More specifically, since one 207-byte data packet has the same amount of data as a data segment, a data packet prior to being interleaved may also be used as a data segment. At this point, two VSB fields are grouped to form a VSB frame.

Figure 5:
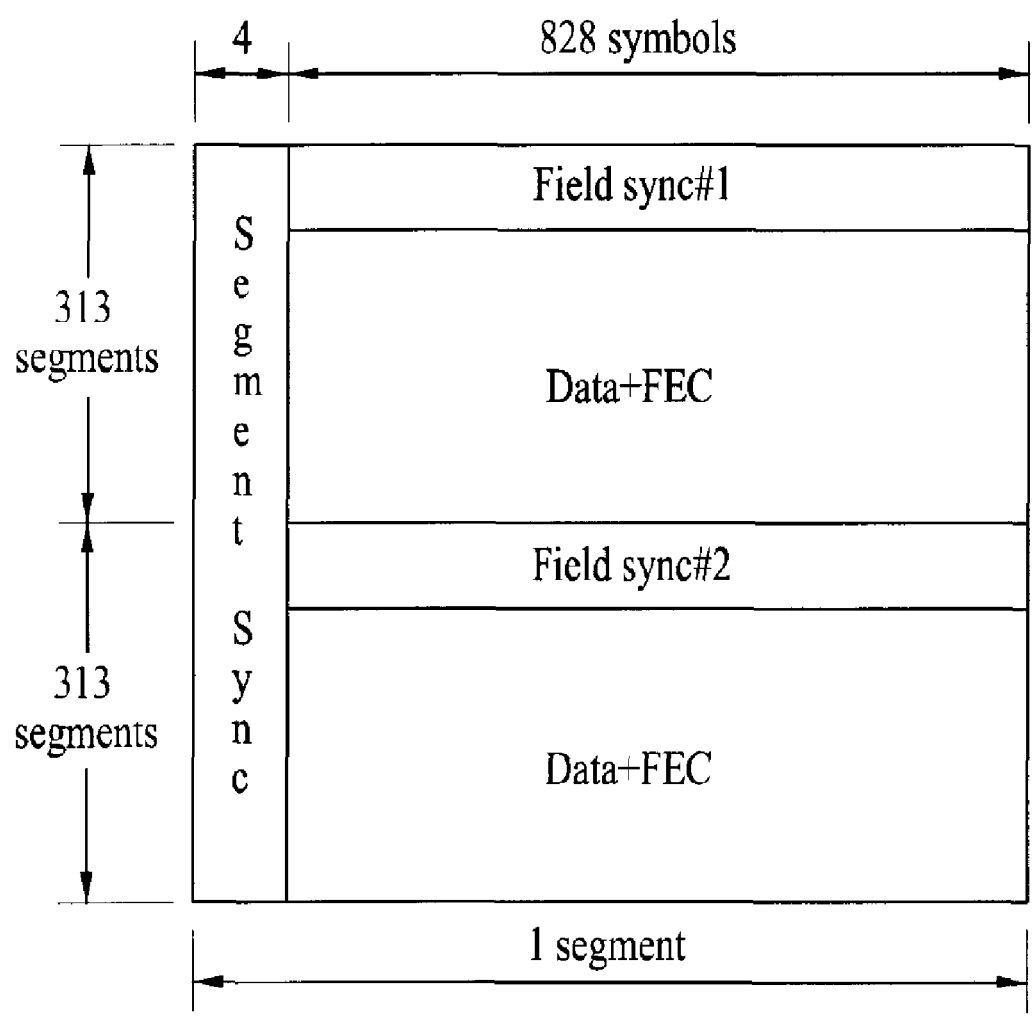
FIG. 5 illustrates an example of a general VSB frame structure.

FIG. 5 illustrates an exemplary structure of a VSB frame, wherein one VSB frame consists of 2 VSB fields (i.e., an odd field and an even field). Herein, each VSB field includes a field synchronization segment and 312 data segments.

The slot corresponds to a basic time unit for multiplexing the mobile service data and the main service data. Herein, one slot may either include the mobile service data or be configured only of the main service data.

If the first 118 data packets within the slot correspond to a data group, the remaining 38 data packets become the main service data packets. In another example, when no data group exists in a slot, the corresponding slot is configured of 156 main service data packets.

Meanwhile, when the slots are assigned to a VSB frame, an off-set exists for each assigned position.

Figure 6:
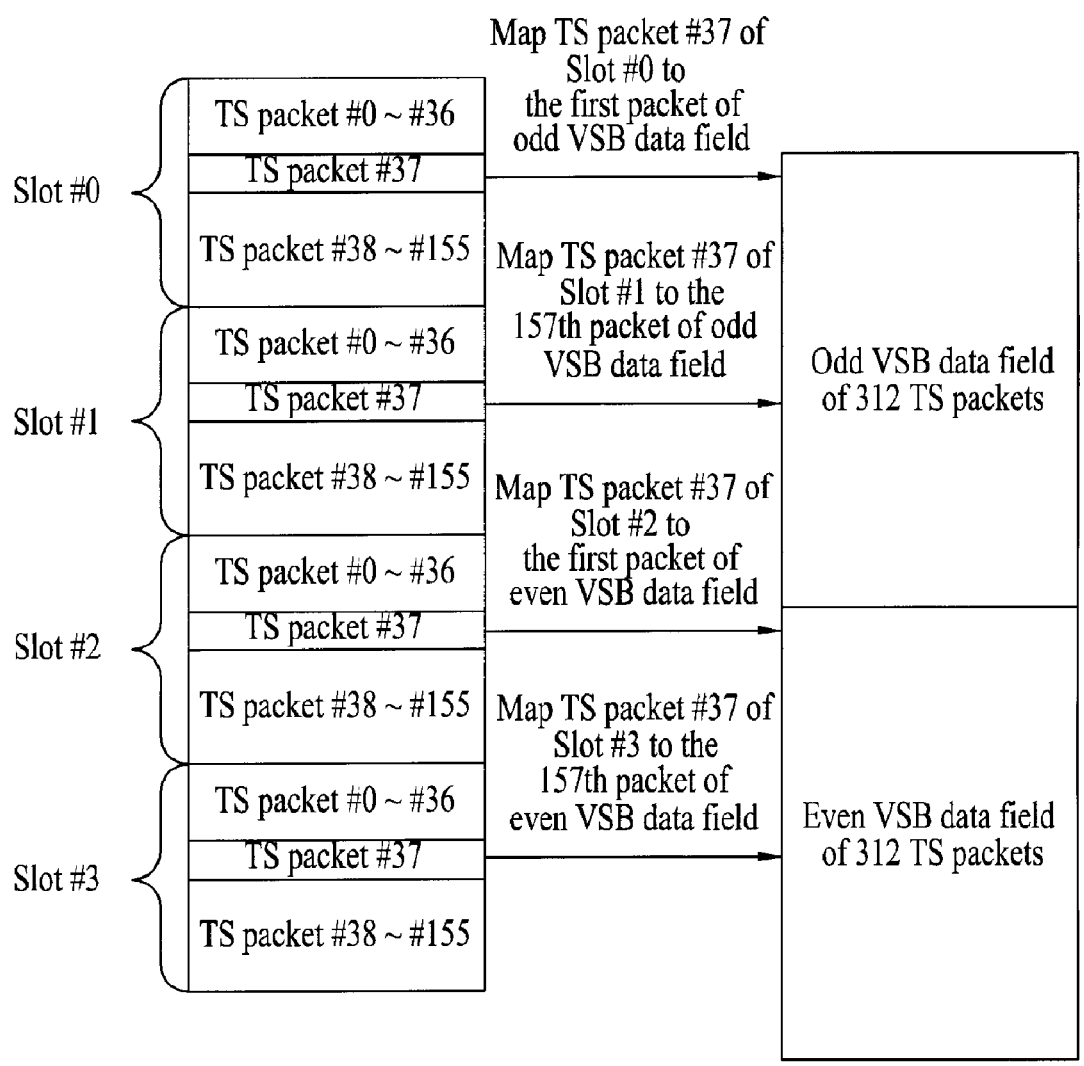
FIG. 6 illustrates a example of mapping positions of the first 4 slots of a sub-frame in a spatial area with respect to a VSB frame.

FIG. 6 illustrates a mapping example of the positions to which the first 4 slots of a sub-frame are assigned with respect to a VSB frame in a spatial area. And, FIG. 7 illustrates a mapping example of the positions to which the first 4 slots of a sub-frame are assigned with respect to a VSB frame in a chronological (or time) area.

Figure 7:
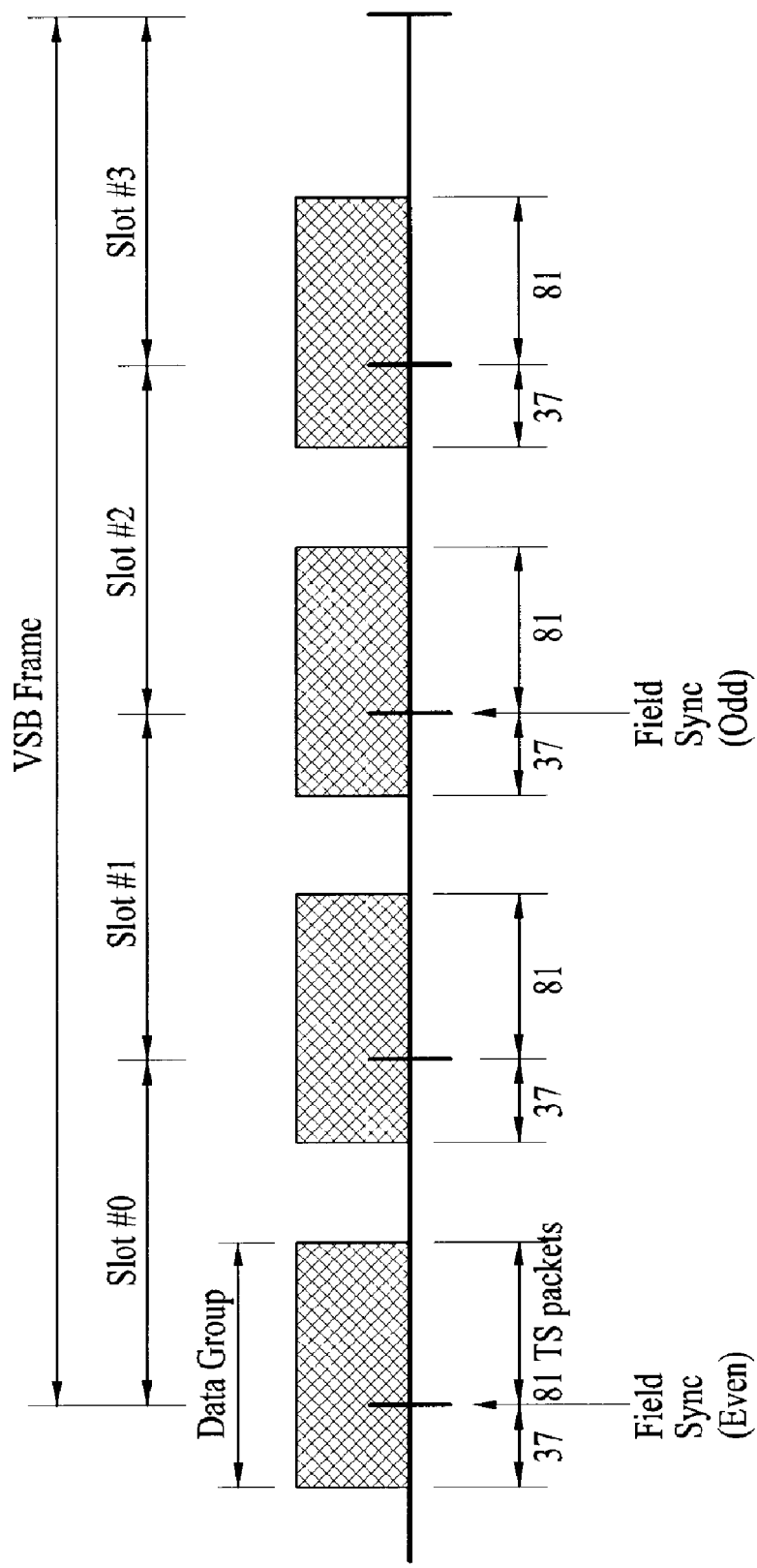
FIG. 7 illustrates a example of mapping positions of the first 4 slots of a sub-frame in a chronological (or time) area with respect to a VSB frame.

Referring to FIG. 6 and FIG. 7, a $38^{th}$ data packet (TS packet #37) of a $1^{st}$ slot (Slot #0) is mapped to the $1^{st}$ data packet of an odd VSB field. A $38^{th}$ data packet (TS packet #37) of a $2^{nd}$ slot (Slot #1) is mapped to the $157^{th}$ data packet of an odd VSB field. Also, a $38^{th}$ data packet (TS packet #37) of a $3^{rd}$ slot (Slot #2) is mapped to the $1^{st}$ data packet of an even VSB field. And, a $38^{th}$ data packet (TS packet #37) of a $4^{th}$ slot (Slot #3) is mapped to the $157^{th}$ data packet of an even VSB field. Similarly, the remaining 12 slots within the corresponding sub-frame are mapped in the subsequent VSB frames using the same method.

Figure 8:
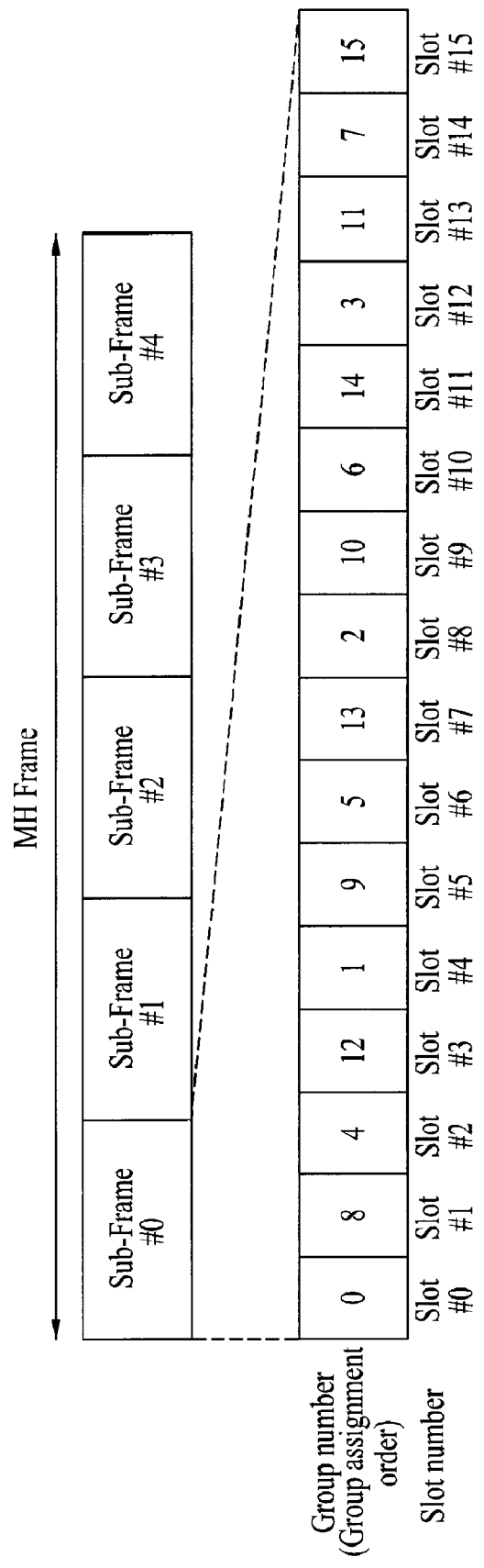
FIG. 8 illustrates an exemplary order of data groups being assigned to one of 5 sub-frames configuring an MH frame according to the present invention.

FIG. 8 illustrates an exemplary assignment order of data groups being assigned to one of 5 sub-frames, wherein the 5 sub-frames configure an MH frame. For example, the method of assigning data groups may be identically applied to all MH frames or differently applied to each MH frame. Furthermore, the method of assigning data groups may be identically applied to all sub-frames or differently applied to each sub-frame. At this point, when it is assumed that the data groups are assigned using the same method in all sub-frames of the corresponding MH frame, the total number of data groups being assigned to an MH frame is equal to a multiple of '5'.

According to the embodiment of the present invention, a plurality of consecutive data groups is assigned to be spaced as far apart from one another as possible within the sub-frame. Thus, the system can be capable of responding promptly and effectively to any burst error that may occur within a sub-frame.

For example, when it is assumed that 3 data groups are assigned to a sub-frame, the data groups are assigned to a $1^{st}$ slot (Slot #0), a $5^{th}$ slot (Slot #4), and a $9^{th}$ slot (Slot #8) in the sub-frame, respectively. FIG. 8 illustrates an example of assigning 16 data groups in one sub-frame using the above-described pattern (or rule). In other words, each data group is serially assigned to 16 slots corresponding to the following numbers: 0, 8, 4, 12, 1, 9, 5, 13, 2, 10, 6, 14, 3, 11, 7, and 15. Equation 1 below shows the above-described rule (or pattern) for assigning data groups in a sub-frame.

$$j=(4i+O)\bmod 16 \qquad \text{Equation 1}$$

Herein,
O=0 if i<4,
O=2 else if i<8,
O=1 else if i<12,
O=3 else.

Herein, j indicates the slot number within a sub-frame. The value of j may range from 0 to 15 (i.e., $0 \leq j \leq 15$). Also, variable i indicates the data group number. The value of i may range from 0 to 15 (i.e., $0 \leq i \leq 15$).

In the present invention, a collection of data groups included in a MH frame will be referred to as a "parade". Based upon the RS frame mode, the parade transmits data of at least one specific RS frame.

The mobile service data within one RS frame may be assigned either to all of regions A/B/C/D within the corresponding data group, or to at least one of regions A/B/C/D. In the embodiment of the present invention, the mobile service data within one RS frame may be assigned either to all of regions A/B/C/D, or to at least one of regions A/B and regions C/D. If the mobile service data are assigned to the latter case (i.e., one of regions A/B and regions C/D), the RS frame being assigned to regions A/B and the RS frame being assigned to regions C/D within the corresponding data group are different from one another. According to the embodiment of the present invention, the RS frame being assigned to regions A/B within the corresponding data group will be referred to as a "primary RS frame", and the RS frame being assigned to regions C/D within the corresponding data group will be referred to as a "secondary RS frame", for simplicity. Also, the primary RS frame and the secondary RS frame form (or configure) one parade. More specifically, when the mobile service data within one RS frame are assigned either to all of regions A/B/C/D within the corresponding data group, one parade transmits one RS frame. Conversely, when the mobile service data within one RS frame are assigned either to at least one of regions A/B and regions C/D, one parade may transmit up to 2 RS frames.

More specifically, the RS frame mode indicates whether a parade transmits one RS frame, or whether the parade transmits two RS frames. Such RS frame mode is transmitted as the above-described TPC data.

Table 1 below shows an example of the RS frame mode.

TABLE 1

| RS frame mode (2 bits) | Description |
|---|---|
| 00 | There is only one primary RS frame for all group regions |
| 01 | There are two separate RS frames. Primary RS frame for group regions A and B Secondary RS frame for group regions C and D |
| 10 | Reserved |
| 11 | Reserved |

Table 1 illustrates an example of allocating 2 bits in order to indicate the RS frame mode. For example, referring to Table 1, when the RS frame mode value is equal to '00', this indicates that one parade transmits one RS frame. And, when the RS frame mode value is equal to '01', this indicates that one parade transmits two RS frames, i.e., the primary RS frame and the secondary RS frame. More specifically, when the RS frame mode value is equal to '01', data of the primary RS frame for regions A/B are assigned and transmitted to regions A/B of the corresponding data group. Similarly, data of the secondary RS frame for regions C/D are assigned and transmitted to regions C/D of the corresponding data group.

As described in the assignment of data groups, the parades are also assigned to be spaced as far apart from one another as possible within the sub-frame. Thus, the system can be capable of responding promptly and effectively to any burst error that may occur within a sub-frame.

Furthermore, the method of assigning parades may be identically applied to all MH frames or differently applied to each MH frame. According to the embodiment of the present invention, the parades may be assigned differently for each MH frame and identically for all sub-frames within an MH frame. More specifically, the MH frame structure may vary by MH frame units. Thus, an ensemble rate may be adjusted on a more frequent and flexible basis.

Figure 9:
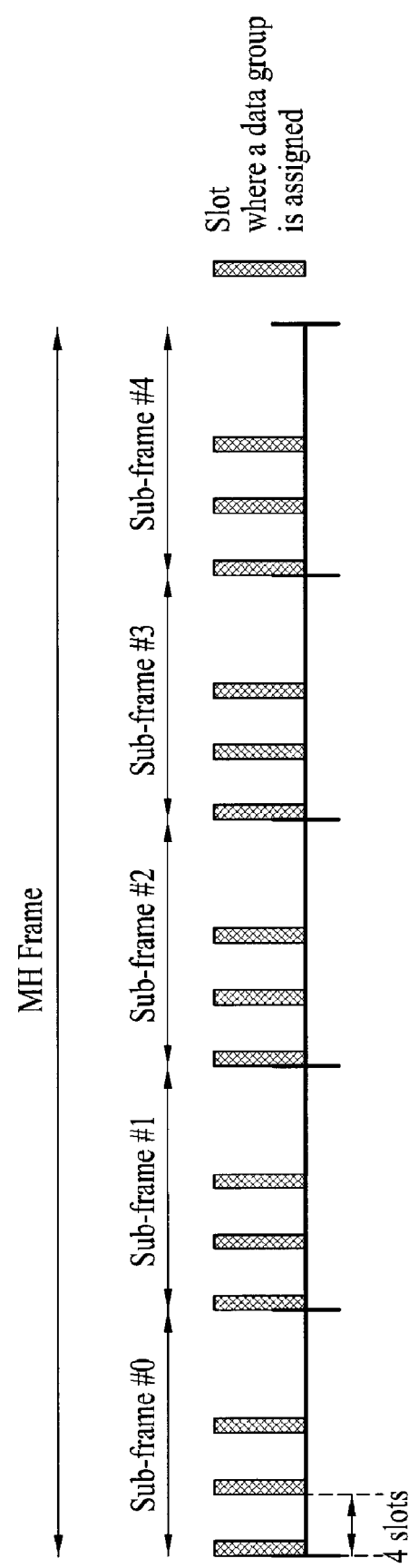
FIG. 9 illustrates an example of a single parade being assigned to an MH frame according to the present invention.

FIG. 9 illustrates an example of multiple data groups of a single parade being assigned (or allocated) to an MH frame. More specifically, FIG. 9 illustrates an example of a plurality of data groups included in a single parade, wherein the number of data groups included in a sub-frame is equal to '3', being allocated to an MH frame.

Referring to FIG. 9, 3 data groups are sequentially assigned to a sub-frame at a cycle period of 4 slots. Accordingly, when this process is equally performed in the 5 sub-frames included in the corresponding MH frame, 15 data groups are assigned to a single MH frame. Herein, the 15 data groups correspond to data groups included in a parade. Therefore, since one sub-frame is configured of 4 VSB frame, and since 3 data groups are included in a sub-frame, the data group of the corresponding parade is not assigned to one of the 4 VSB frames within a sub-frame.

For example, when it is assumed that one parade transmits one RS frame, and that a RS frame encoder (not shown) included in the transmitting system performs RS-encoding on the corresponding RS frame, thereby adding 24 bytes of parity data to the corresponding RS frame and transmitting the processed RS frame, the parity data occupy approximately 11.37% (=24/(187+24)×100) of the total code word length. Meanwhile, when one sub-frame includes 3 data groups, and when the data groups included in the parade are assigned, as shown in FIG. 9, a total of 15 data groups form an RS frame. Accordingly, even when an error occurs in an entire data group due to a burst noise within a channel, the percentile is merely 6.67% (=1/15×100). Therefore, the receiving system may correct all errors by performing an erasure RS decoding process. More specifically, when the erasure RS decoding is performed, a number of channel errors corresponding to the number of RS parity bytes may be corrected. By doing so, the receiving system may correct the error of at least one data group within one parade. Thus, the minimum burst noise length correctable by a RS frame is over 1 VSB frame.

Meanwhile, when data groups of a parade are assigned as shown in FIG. 9, either main service data may be assigned between each data group, or data groups corresponding to different parades may be assigned between each data group. More specifically, data groups corresponding to multiple parades may be assigned to one MH frame.

Basically, the method of assigning data groups corresponding to multiple parades is very similar to the method of assigning data groups corresponding to a single parade. In other words, data groups included in other parades that are to be assigned to an MH frame are also respectively assigned according to a cycle period of 4 slots.

At this point, data groups of a different parade may be sequentially assigned to the respective slots in a circular method. Herein, the data groups are assigned to slots starting from the ones to which data groups of the previous parade have not yet been assigned.

For example, when it is assumed that data groups corresponding to a parade are assigned as shown in FIG. 9, data groups corresponding to the next parade may be assigned to a sub-frame starting either from the $12^{th}$ slot of a sub-frame. However, this is merely exemplary. In another example, the data groups of the next parade may also be sequentially assigned to a different slot within a sub-frame at a cycle period of 4 slots starting from the $3^{rd}$ slot.

Figure 10:
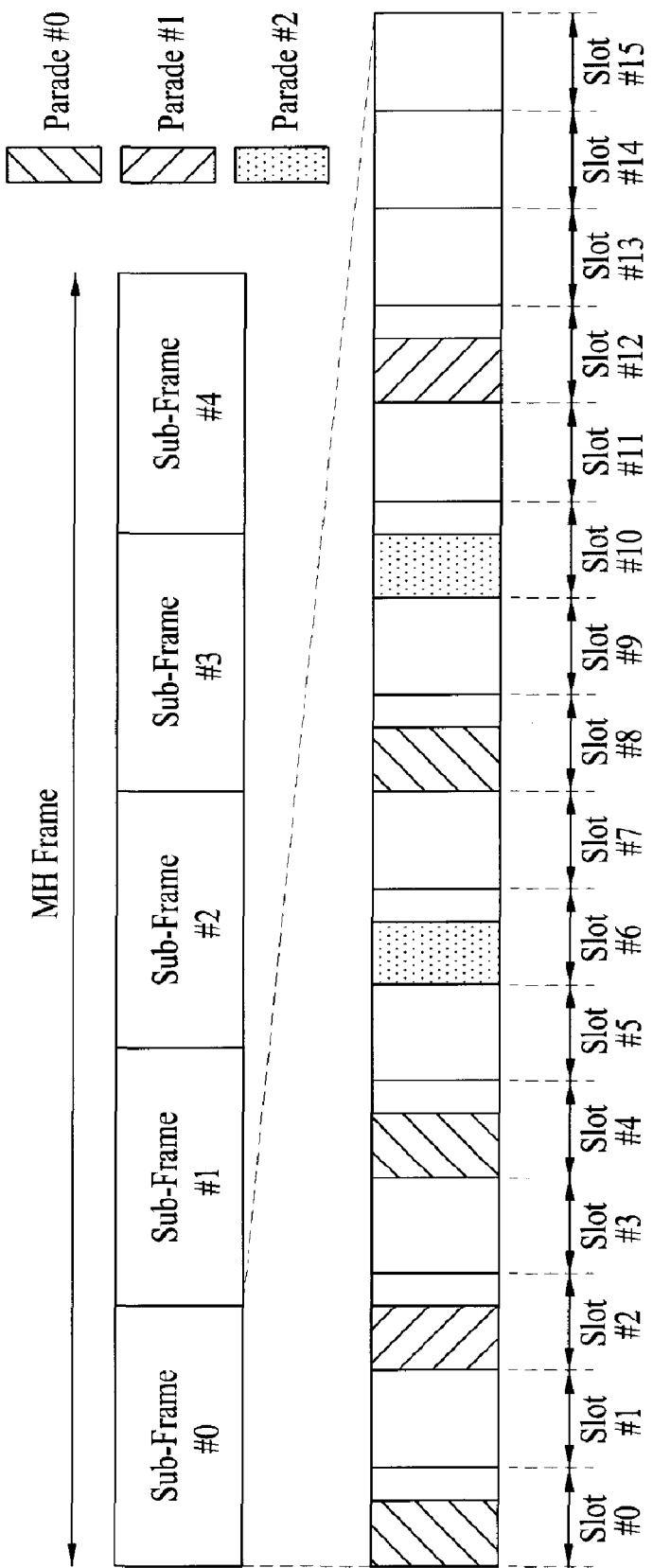
FIG. 10 illustrates an example of 3 parades being assigned to an MH frame according to the present invention.

FIG. 10 illustrates an example of transmitting 3 parades (Parade #0, Parade #1, and Parade #2) to an MH frame. More specifically, FIG. 10 illustrates an example of transmitting parades included in one of 5 sub-frames, wherein the 5 sub-frames configure one MH frame.

When the $1^{st}$ parade (Parade #0) includes 3 data groups for each sub-frame, the positions of each data groups within the sub-frames may be obtained by substituting values '0' to '2' for i in Equation 1. More specifically, the data groups of the $1^{st}$ parade (Parade #0) are sequentially assigned to the $1^{st}$, $5^{th}$, and $9^{th}$ slots (Slot #0, Slot #4, and Slot #8) within the sub-frame.

Also, when the $2^{nd}$ parade includes 2 data groups for each sub-frame, the positions of each data groups within the sub-frames may be obtained by substituting values '3' and '4' for in Equation 1. More specifically, the data groups of the $2^{nd}$ parade (Parade #1) are sequentially assigned to the $2^{nd}$ and $12^{th}$ slots (Slot #1 and Slot #11) within the sub-frame.

Finally, when the $3^{rd}$ parade includes 2 data groups for each sub-frame, the positions of each data groups within the sub-frames may be obtained by substituting values '5' and '6' for i in Equation 1. More specifically, the data groups of the $3^{rd}$ parade (Parade #2) are sequentially assigned to the $7^{th}$ and $11^{th}$ slots (Slot #6 and Slot #10) within the sub-frame.

As described above, data groups of multiple parades may be assigned to a single MH frame, and, in each sub-frame, the data groups are serially allocated to a group space having 4 slots from left to right.

Therefore, a number of groups of one parade per sub-frame (NoG) may correspond to any one integer from '1' to '8'. Herein, since one MH frame includes 5 sub-frames, the total number of data groups within a parade that can be allocated to an MH frame may correspond to any one multiple of '5' ranging from '5' to '40'.

Figure 11:
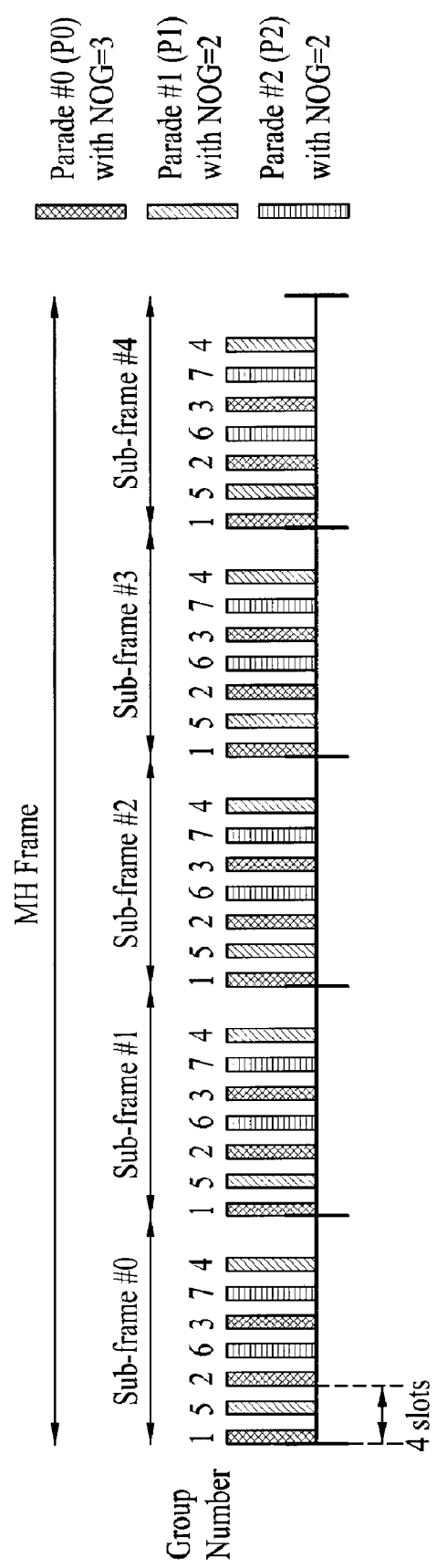
FIG. 11 illustrates an example of the process of assigning 3 parades shown in FIG. 10 being expanded to 5 sub-frames within an MH frame.

FIG. 11 illustrates an example of expanding the assignment process of 3 parades, shown in FIG. 10, to 5 sub-frames within an MH frame.

Figure 12:
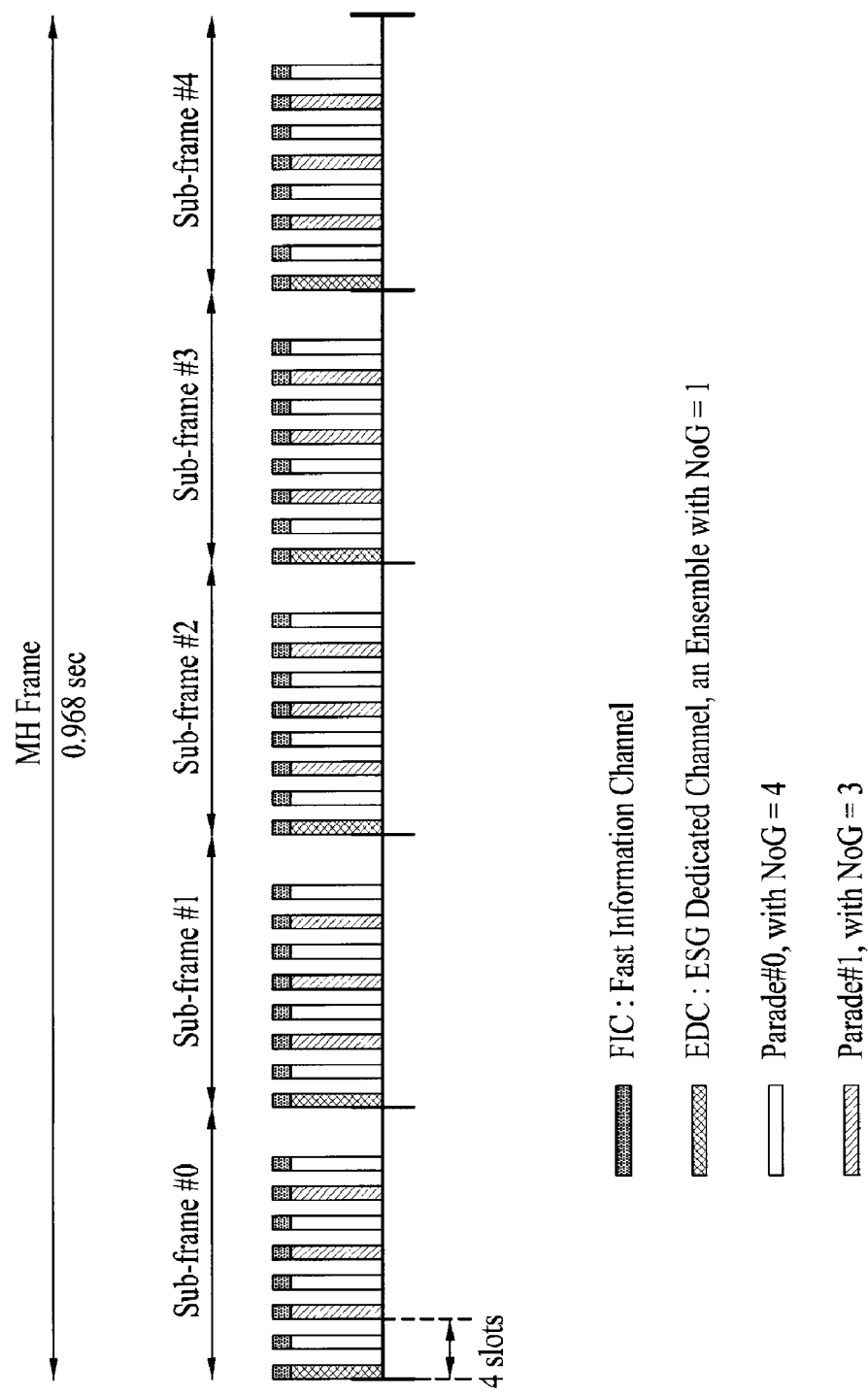
FIG. 12 illustrates a data transmission structure according to an embodiment of the present invention, wherein signaling data are included in a data group so as to be transmitted.

FIG. 12 illustrates a data transmission structure according to an embodiment of the present invention, wherein signaling data are included in a data group so as to be transmitted.

As described above, an MH frame is divided into 5 sub-frames. Data groups corresponding to a plurality of parades co-exist in each sub-frame. Herein, the data groups corresponding to each parade are grouped by MH frame units, thereby configuring a single parade.

The data structure shown in FIG. 12 includes 3 parades, one ESG dedicated channel (EDC) parade (i.e., parade with NoG=1), and 2 service parades (i.e., parade with NoG=4 and parade with NoG=3). Also, a predetermined portion of each data group (i.e., 37 bytes/data group) is used for delivering (or sending) FIC information associated with mobile service data, wherein the FIC information is separately encoded from the RS-encoding process. The FIC region assigned to each data group consists of one FIC segments. Herein, each segment is interleaved by MH sub-frame units, thereby configuring an FIC body, which corresponds to a completed FIC transmission structure. However, whenever required, each segment may be interleaved by MH frame units and not by MH sub-frame units, thereby being completed in MH frame units.

Meanwhile, the concept of an MH ensemble is applied in the embodiment of the present invention, thereby defining a collection (or group) of services. Each MH ensemble carries the same QoS and is coded with the same FEC code. Also, each MH ensemble has the same unique identifier (i.e., ensemble ID) and corresponds to consecutive RS frames.

As shown in FIG. 12, the FIC segment corresponding to each data group described service information of an MH ensemble to which the corresponding data group belongs. When FIC segments within a sub-frame are grouped and deinterleaved, all service information of a physical channel through which the corresponding FICs are transmitted may be obtained. Therefore, the receiving system may be able to acquire the channel information of the corresponding physical channel, after being processed with physical channel tuning, during a sub-frame period.

Furthermore, FIG. 12 illustrates a structure further including a separate EDC parade apart from the service parade and wherein electronic service guide (ESG) data are transmitted in the 1$^{st}$ slot of each sub-frame.

Hierarchical Signaling Structure

Figure 13:
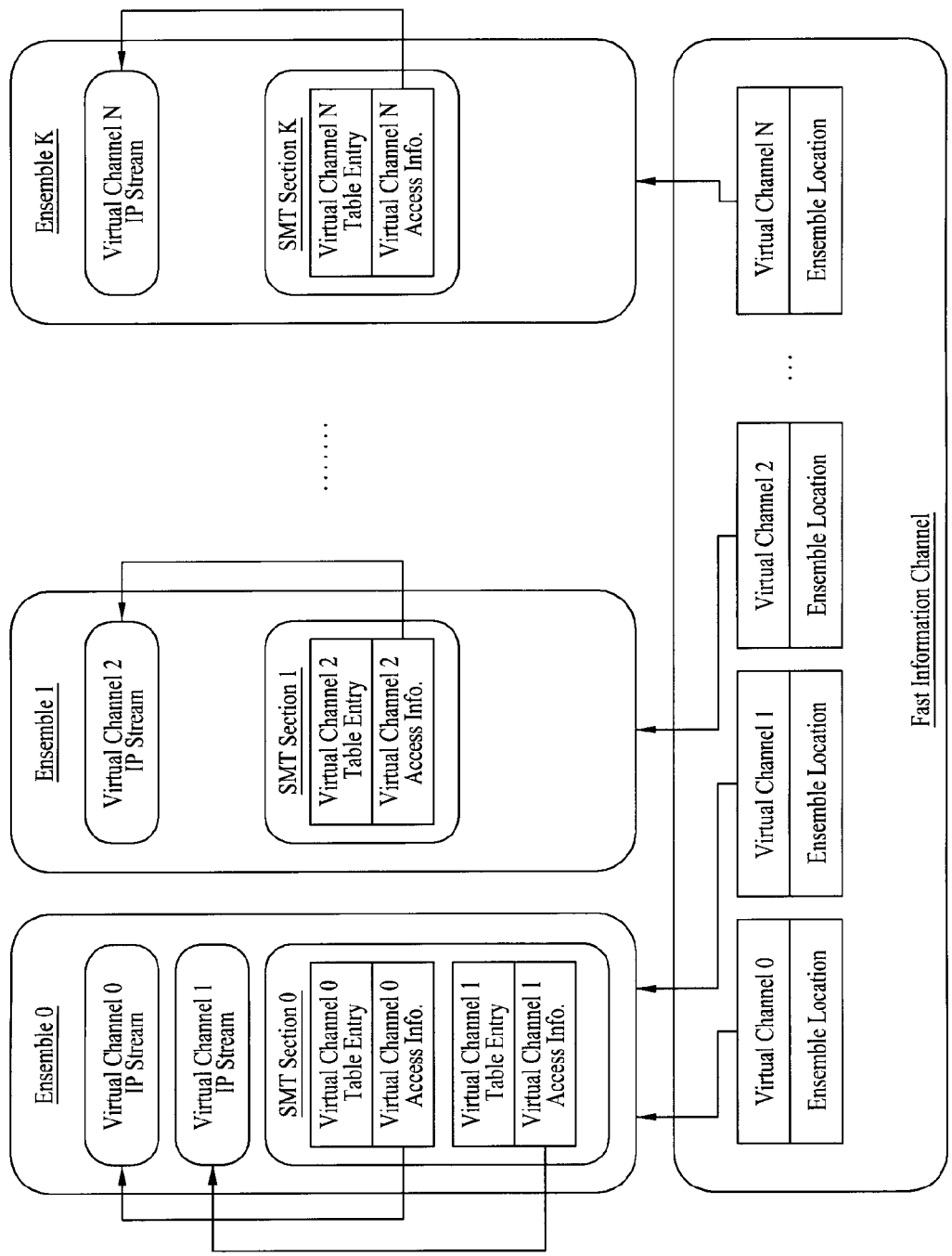
FIG. 13 illustrates a hierarchical signaling structure according to an embodiment of the present invention.

FIG. 13 illustrates a hierarchical signaling structure according to an embodiment of the present invention. As shown in FIG. 13, the mobile broadcasting technology according to the embodiment of the present invention adopts a signaling method using FIC and SMT. In the description of the present invention, the signaling structure will be referred to as a hierarchical signaling structure.

Hereinafter, a detailed description on how the receiving system accesses a virtual channel via FIC and SMT will now be given with reference to FIG. 13.

The FIC body defined in an MH transport (M1) identifies the physical location of each the data stream for each virtual channel and provides very high level descriptions of each virtual channel.

Being MH ensemble level signaling information, the service map table (SMT) provides MH ensemble level signaling information. The SMT provides the IP access information of each virtual channel belonging to the respective MH ensemble within which the SMT is carried. The SMT also provides all IP stream component level information required for the virtual channel service acquisition.

Referring to FIG. 13, each MH ensemble (i.e., Ensemble 0, Ensemble 1, . . . , Ensemble K) includes a stream information on each associated (or corresponding) virtual channel (e.g., virtual channel 0 IP stream, virtual channel 1 IP stream, and virtual channel 2 IP stream). For example, Ensemble 0 includes virtual channel 0 IP stream and virtual channel 1 IP stream. And, each MH ensemble includes diverse information on the associated virtual channel (i.e., Virtual Channel 0 Table Entry, Virtual Channel 0 Access Info, Virtual Channel 1 Table Entry, Virtual Channel 1 Access Info, Virtual Channel 2 Table Entry, Virtual Channel 2 Access Info, Virtual Channel N Table Entry, Virtual Channel N Access Info, and so on).

The FIC body payload includes information on MH ensembles (e.g., ensemble_id field, and referred to as "ensemble location" in FIG. 13) and information on a virtual channel associated with the corresponding MH ensemble (e.g., when such information corresponds to a major_channel_num field and a minor_channel_num field, the information is expressed as Virtual Channel 0, Virtual Channel 1, . . . , Virtual Channel N in FIG. 13).

The application of the signaling structure in the receiving system will now be described in detail.

When a user selects a channel he or she wishes to view (hereinafter, the user-selected channel will be referred to as "channel θ" for simplicity), the receiving system first parses the received FIC. Then, the receiving system acquires information on an MH ensemble (i.e., ensemble location), which is associated with the virtual channel corresponding to channel θ (hereinafter, the corresponding MH ensemble will be referred to as "MH ensemble θ" for simplicity). By acquiring slots only corresponding to the MH ensemble θ using the time-slicing method, the receiving system configures ensemble θ. The ensemble θ configured as described above, includes an SMT on the associated virtual channels (including channel θ) and IP streams on the corresponding virtual channels. Therefore, the receiving system uses the SMT included in the MH ensemble θ in order to acquire various information on channel θ (e.g., Virtual Channel θ Table Entry) and stream access information on channel θ (e.g., Virtual Channel θ Access Info). The receiving system uses the stream access information on channel θ to receive only the associated IP streams, thereby providing channel θ services to the user.

Fast Information Channel (FIC)

The digital broadcast receiving system according to the present invention adopts the fast information channel (FIC) for a faster access to a service that is currently being broadcasted.

More specifically, the FIC handler 215 of FIG. 1 parses the FIC body, which corresponds to an FIC transmission structure, and outputs the parsed result to the physical adaptation control signal handler 216.

Figure 14:
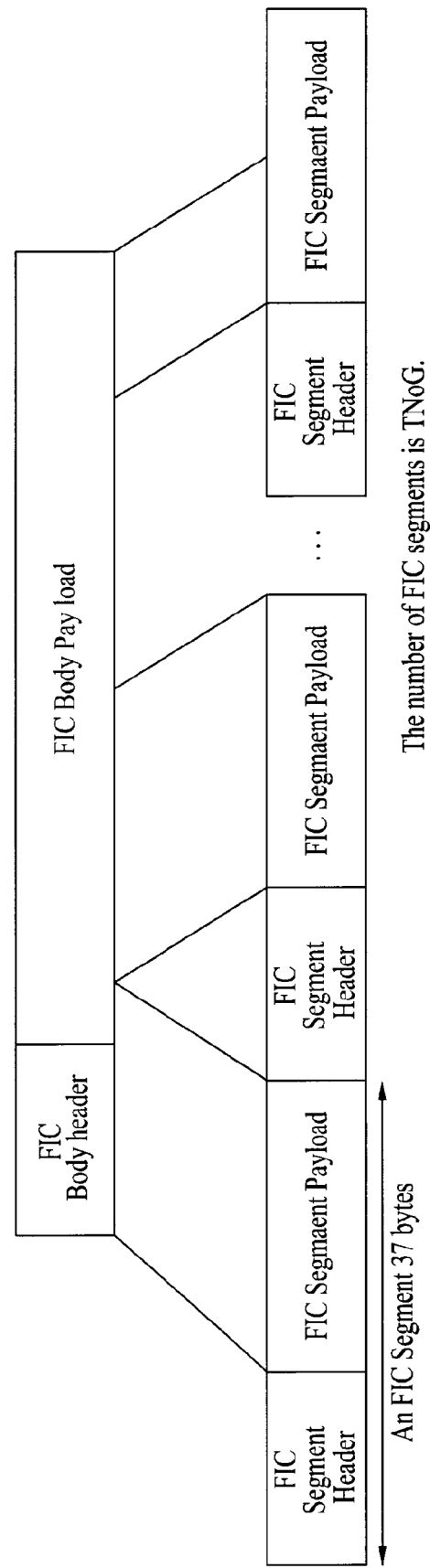
FIG. 14 illustrates an exemplary FIC body format according to an embodiment of the present invention.

FIG. 14 illustrates an exemplary FIC body format according to an embodiment of the present invention. According to the embodiment of the present invention, the FIC format consists of an FIC body header and an FIC body payload.

Meanwhile, according to the embodiment of the present invention, data are transmitted through the FIC body header and the FIC body payload in FIC segment units. Each FIC segment has the size of 37 bytes, and each FIC segment consists of a 2-byte FIC segment header and a 35-byte FIC segment payload. More specifically, an FIC body configured of an FIC body header and an FIC body payload, is segmented in units of 35 data bytes, which are then carried in at least one FIC segment within the FIC segment payload, so as to be transmitted.

In the description of the present invention, an example of inserting one FIC segment in one data group, which is then transmitted, will be given. In this case, the receiving system receives a slot corresponding to each data group by using a time-slicing method.

The signaling decoder 190 included in the receiving system shown in FIG. 1 collects each FIC segment inserted in each data group. Then, the signaling decoder 190 uses the collected FIC segments to created a single FIC body. Thereafter, the signaling decoder 190 performs a decoding process on the FIC body payload of the created FIC body, so that the decoded FIC body payload corresponds to an encoded result of a signaling encoder (not shown) included in the transmitting system. Subsequently, the decoded FIC body payload is outputted to the FIC handler 215. The FIC handler 215 parses the FIC data included in the FIC body payload, and then outputs the parsed FIC data to the physical adaptation control signal handler 216. The physical adaptation control signal handler 216 uses the inputted FIC data to perform processes associated with MH ensembles, virtual channels, SMTs, and so on.

According to an embodiment of the present invention, when an FIC body is segmented, and when the size of the last segmented portion is smaller than 35 data bytes, it is assumed that the lacking number of data bytes in the FIC segment payload is completed with by adding the same number of stuffing bytes therein, so that the size of the last FIC segment can be equal to 35 data bytes.

However, it is apparent that the above-described data byte values (i.e., 37 bytes for the FIC segment, 2 bytes for the FIC segment header, and 35 bytes for the FIC segment payload) are merely exemplary, and will, therefore, not limit the scope of the present invention.

FIG. 15 illustrates an exemplary bit stream syntax structure with respect to an FIC segment according to an embodiment of the present invention.

Herein, the FIC segment signifies a unit used for transmitting the FIC data. The FIC segment consists of an FIC segment header and an FIC segment payload. Referring to FIG. 15, the FIC segment payload corresponds to the portion starting from the 'for' loop statement. Meanwhile, the FIC segment header may include a FIC_type field, an error_indicator field, an FIC_seg_number field, and an FIC_last_seg_number field. A detailed description of each field will now be given.

The FIC_type field is a 2-bit field indicating the type of the corresponding FIC.

The error_indicator field is a 1-bit field, which indicates whether or not an error has occurred within the FIC segment during data transmission. If an error has occurred, the value of the error_indicator field is set to '1'. More specifically, when an error that has failed to be recovered still remains during the configuration process of the FIC segment, the error_indicator field value is set to '1'. The error_indicator field enables the receiving system to recognize the presence of an error within the FIC data.

The FIC_seg_number field is a 4-bit field. Herein, when a single FIC body is divided into a plurality of FIC segments and transmitted, the FIC_seg_number field indicates the number of the corresponding FIC segment.

Finally, the FIC_last_seg_number field is also a 4-bit field. The FIC_last_seg_number field indicates the number of the last FIC segment within the corresponding FIC body.

FIG. 16 illustrates an exemplary bit stream syntax structure with respect to a payload of an FIC segment according to the present invention, when an FIC type field value is equal to '0'.

According to the embodiment of the present invention, the payload of the FIC segment is divided into 3 different regions.

A first region of the FIC segment payload exists only when the FIC_seg_number field value is equal to '0'. Herein, the first region may include a current_next_indicator field, an ESG_version field, and a transport_stream_id field. However, depending upon the embodiment of the present invention, it may be assumed that each of the 3 fields exists regardless of the FIC_seg_number field.

The current_next_indicator field is a 1-bit field. The current_next_indicator field acts as an indicator identifying whether the corresponding FIC data carry MH ensemble configuration information of an MH frame including the current FIC segment, or whether the corresponding FIC data carry MH ensemble configuration information of a next MH frame.

The ESG_version field is a 5-bit field indicating ESG version information. Herein, by providing version information on the service guide providing channel of the corresponding ESG, the ESG_version field enables the receiving system to notify whether or not the corresponding ESG has been updated.

Finally, the transport_stream_id field is a 16-bit field acting as a unique identifier of a broadcast stream through which the corresponding FIC segment is being transmitted.

A second region of the FIC segment payload corresponds to an ensemble loop region, which includes an ensemble_id field, an SI_version field, and a num_channel field.

More specifically, the ensemble_id field is an 8-bit field indicating identifiers of an MH ensemble through which MH services are transmitted. The MH services will be described in more detail in a later process. Herein, the ensemble_id field binds the MH services and the MH ensemble.

The SI_version field is a 4-bit field indicating version information of SI data included in the corresponding ensemble, which is being transmitted within the RS frame.

Finally, the num_channel field is an 8-bit field indicating the number of virtual channel being transmitted via the corresponding ensemble.

A third region of the FIC segment payload a channel loop region, which includes a channel_type field, a channel_activity field, a CA_indicator field, a stand_alone_service_indicator field, a major_channel_num field, and a minor_channel_num field.

The channel_type field is a 5-bit field indicating a service type of the corresponding virtual channel. For example, the channel_type field may indicates an audio/video channel, an audio/video and data channel, an audio-only channel, a data-only channel, a file download channel, an ESG delivery channel, a notification channel, and so on.

The channel_activity field is a 2-bit field indicating activity information of the corresponding virtual channel.

More specifically, the channel_activity field may indicate whether the current virtual channel is providing the current service.

The CA_indicator field is a 1-bit field indicating whether or not a conditional access (CA) is applied to the current virtual channel.

The stand_alone_service_indicator field is also a 1-bit field, which indicates whether the service of the corresponding virtual channel corresponds to a stand alone service.

The major_channel_num field is an 8-bit field indicating a major_channel_number of the corresponding virtual channel.

Finally, the minor_channel_num field is also an 8-bit field indicating a minor_channel_number of the corresponding virtual channel.

Service Table Map

FIG. 17 illustrates an exemplary bit stream syntax structure of a service map table (hereinafter referred to as "SMT") according to the present invention.

According to the embodiment of the present invention, the SMT is configured in an MPEG-2 private section format. However, this will not limit the scope and spirit of the present invention. The SMT according to the embodiment of the present invention includes description information for each virtual channel within a single MH ensemble. And, additional information may further be included in each descriptor area.

Herein, the SMT according to the embodiment of the present invention includes at least one field and is transmitted from the transmitting system to the receiving system.

As described in FIG. 3, the SMT section may be transmitted by being included in the MH TP within the RS frame. In this case, each of the RS frame decoders 170 and 180, shown in FIG. 1, decodes the inputted RS frame, respectively. Then, each of the decoded RS frames is outputted to the respective RS frame handler 211 and 212. Thereafter, each RS frame handler 211 and 212 identifies the inputted RS frame by row units, so as to create an MH TP, thereby outputting the created MH TP to the MH TP handler 213.

When it is determined that the corresponding MH TP includes an SMT section based upon the header in each of the inputted MH TP, the MH TP handler 213 parses the corresponding SMT section, so as to output the SI data within the parsed SMT section to the physical adaptation control signal handler 216. However, this is limited to when the SMT is not encapsulated to IP datagrams.

Meanwhile, when the SMT is encapsulated to IP datagrams, and when it is determined that the corresponding MH TP includes an SMT section based upon the header in each of the inputted MH TP, the MH TP handler 213 outputs the SMT section to the IP network stack 220. Accordingly, the IP network stack 220 performs IP and UDP processes on the inputted SMT section and, then, outputs the processed SMT section to the SI handler 240. The SI handler 240 parses the inputted SMT section and controls the system so that the parsed SI data can be stored in the storage unit 290.

The following corresponds to example of the fields that may be transmitted through the SMT.

A table_id field corresponds to an 8-bit unsigned integer number, which indicates the type of table section. The table_id field allows the corresponding table to be defined as the service map table (SMT).

An ensemble_id field is an 8-bit unsigned integer field, which corresponds to an ID value associated to the corresponding MH ensemble. Herein, the ensemble_id field may be assigned with a value ranging from range '0x00' to '0x3F'. It is preferable that the value of the ensemble_id field is derived from the parade_id of the TPC data, which is carried from the baseband processor of MH physical layer subsystem.

When the corresponding MH ensemble is transmitted through (or carried over) the primary RS frame, a value of '0' may be used for the most significant bit (MSB), and the remaining 7 bits are used as the parade_id value of the associated MH parade (i.e., for the least significant 7 bits). Alternatively, when the corresponding MH ensemble is transmitted through (or carried over) the secondary RS frame, a value of '1' may be used for the most significant bit (MSB).

A num_channels field is an 8-bit field, which specifies the number of virtual channels in the corresponding SMT section.

Meanwhile, the SMT according to the embodiment of the present invention provides information on a plurality of virtual channels using the 'for' loop statement.

A major_channel_num field corresponds to an 8-bit field, which represents the major_channel_number associated with the corresponding virtual channel. Herein, the major_channel_num field may be assigned with a value ranging from '0x00' to '0xFF'.

A minor_channel_num field corresponds to an 8-bit field, which represents the minor channel number associated with the corresponding virtual channel. Herein, the minor_channel_num field may be assigned with a value ranging from '0x00' to '0xFF'.

A short_channel_name field indicates the short name of the virtual channel. The service id field is a 16-bit unsigned integer number (or value), which identifies the virtual channel service.

A service_type field is a 6-bit enumerated type field, which designates the type of service carried in the corresponding virtual channel as defined in Table 2 below.

TABLE 2

| | |
|---|---|
| 0x00 | [Reserved] |
| 0x01 | MH_digital_television field: the virtual channel carries television programming (audio, video and optional associated data) conforming to ATSC standards. |
| 0x02 | MH_audio field: the virtual channel carries audio programming (audio service and optional associated data) conforming to ATSC standards. |
| 0x03 | MH_data_only_service field: the virtual channel carries a data service conforming to ATSC standards, but no video or audio component. |
| 0x04 to 0xFF | [Reserved for future ATSC usage] |

A virtual_channel_activity field is a 2-bit enumerated field identifying the activity status of the corresponding virtual channel. When the most significant bit (MSB) of the virtual_channel_activity field is '1', the virtual channel is active, and when the most significant bit (MSB) of the virtual_channel_activity field is '0', the virtual channel is inactive. Also, when the least significant bit (LSB) of the virtual_channel_activity field is '1', the virtual channel is hidden (when set to 1), and when the least significant bit (LSB) of the virtual_channel_activity field is '0', the virtual channel is not hidden.

A num components field is a 5-bit field, which specifies the number of IP stream components in the corresponding virtual channel.

An IP_version_flag field corresponds to a 1-bit indicator. More specifically, when the value of the IP_version_flag field is set to '1', this indicates that a source_IP_address field, a virtual_channel_target_IP_address field, and a component_target_IP_address field are IPv6 addresses. Alternatively, when the value of the IP_version_flag field is set to '0', this indicates that the source_IP_address field, the virtual_channel_target_IP_address field, and the component_target_IP_address field are IPv4.

A source_IP_address_flag field is a 1-bit Boolean flag, which indicates, when set, that a source_IP_address of the corresponding virtual channel exist for a specific multicast source.

A virtual_channel_target_IP_address_flag field is a 1-bit Boolean flag, which indicates, when set, that the corresponding IP stream component is delivered through IP datagrams with target IP addresses different from the virtual_channel_target_IP_address. Therefore, when the flag is set, the receiving system (or receiver) uses the component_target_IP_address as the target_IP_address in order to access the corresponding IP stream component. Accordingly, the receiving system (or receiver) may ignore the virtual_channel_target_IP_address field included in the num_channels loop.

The source_IP_address field corresponds to a 32-bit or 128-bit field. Herein, the source_IP_address field will be significant (or present), when the value of the source_IP_address_flag field is set to '1'. However, when the value of the source_IP_address_flag field is set to '0', the source_IP_address field will become insignificant (or absent). More specifically, when the source_IP_address_flag field value is set to '1', and when the IP_version_flag field value is set to '0', the source_IP_address field indicates a 32-bit IPv4 address, which shows the source of the corresponding virtual channel. Alternatively, when the IP_version_flag field value is set to '1', the source_IP_address field indicates a 128-bit IPv6 address, which shows the source of the corresponding virtual channel.

The virtual_channel_target_IP_address field also corresponds to a 32-bit or 128-bit field. Herein, the virtual_channel_target_IP_address field will be significant (or present), when the value of the virtual_channel_target_IP_address_flag field is set to '1'. However, when the value of the virtual_channel_target_IP_address_flag field is set to '0', the virtual_channel_target_IP_address field will become insignificant (or absent). More specifically, when the virtual_channel_target_IP_address_flag field value is set to '1', and when the IP_version_flag field value is set to '0', the virtual_channel_target_IP_address field indicates a 32-bit target IPv4 address associated to the corresponding virtual channel. Alternatively, when the virtual_channel_target_IP_address_flag field value is set to '1', and when the IP_version_flag field value is set to '1', the virtual_channel_target_IP_address field indicates a 64-bit target IPv6 address associated to the corresponding virtual channel. If the virtual_channel_target_IP_address field is insignificant (or absent), the component_target_IP_address field within the num_channels loop should become significant (or present). And, in order to enable the receiving system to access the IP stream component, the component_target_IP_address field should be used.

Meanwhile, the SMT according to the embodiment of the present invention uses a 'for' loop statement in order to provide information on a plurality of components.

Herein, an RTP_payload_type field, which is assigned with 7 bits, identifies the encoding format of the component based upon Table 3 shown below. When the IP stream component is not encapsulated to RTP, the RTP_payload_type field shall be ignored (or deprecated).

Table 3 below shows an example of the RTP_payload_type.

TABLE 3

| RTP_payload_type | Meaning |
| --- | --- |
| 35 | AVC video |
| 36 | MH audio |
| 37 to 72 | [Reserved for future ATSC use] |

A component_target_IP_address_flag field is a 1-bit Boolean flag, which indicates, when set, that the corresponding IP stream component is delivered through IP datagrams with target IP addresses different from the virtual_channel_target_IP_address. Furthermore, when the component_target_IP_address_flag is set, the receiving system (or receiver) uses the component_target_IP_address field as the target IP address for accessing the corresponding IP stream component. Accordingly, the receiving system (or receiver) will ignore the virtual_channel_target_IP_address field included in the num_channels loop.

The component_target_IP_address field corresponds to a 32-bit or 128-bit field. Herein, when the value of the IP_version_flag field is set to '0', the component_target_IP_address field indicates a 32-bit target IPv4 address associated to the corresponding IP stream component. And, when the value of the IP_version_flag field is set to '1', the component_target_IP_address field indicates a 128-bit target IPv6 address associated to the corresponding IP stream component.

A port_num_count field is a 6-bit field, which indicates the number of UDP ports associated with the corresponding IP stream component. A target UDP port number value starts from the target_UDP_port_num field value and increases (or is incremented) by 1. For the RTP stream, the target UDP port number should start from the target_UDP_port_num field value and shall increase (or be incremented) by 2. This is to incorporate RTCP streams associated with the RTP streams.

A target_UDP_port_num field is a 16-bit unsigned integer field, which represents the target UDP port number for the corresponding IP stream component. When used for RTP streams, the value of the target_UDP_port_num field shall correspond to an even number. And, the next higher value shall represent the target UDP port number of the associated RTCP stream.

A component_level_descriptor( ) represents zero or more descriptors providing additional information on the corresponding IP stream component.

A virtual_channel_level_descriptor( ) represents zero or more descriptors providing additional information for the corresponding virtual channel.

An ensemble_level_descriptor( ) represents zero or more descriptors providing additional information for the MH ensemble, which is described by the corresponding SMT.

FIG. 18 illustrates an exemplary bit stream syntax structure of an MH audio descriptor according to the present invention.

When at least one audio service is present as a component of the current event, the MH_audio_descriptor( ) shall be used as a component_level_descriptor of the SMT. The MH_audio_descriptor( ) may be capable of informing the system of the audio language type and stereo mode status. If there is no audio service associated with the current event, then it is preferable that the MH_audio_descriptor( ) is considered to be insignificant (or absent) for the current event.

Each field shown in the bit stream syntax of FIG. 18 will now be described in detail.

A descriptor_tag field is an 8-bit unsigned integer having a TBD value, which indicates that the corresponding descriptor is the MH_audio_descriptor( ).

A descriptor_length field is also an 8-bit unsigned integer, which indicates the length (in bytes) of the portion immediately following the descriptor_length field up to the end of the MH_audio_descriptor( ).

A channel_configuration field corresponds to an 8-bit field indicating the number and configuration of audio channels. The values ranging from '1' to '6' respectively indicate the number and configuration of audio channels as given for "Default bit stream index number" in Table 42 of ISO/IEC 13818-7:2006. All other values indicate that the number and configuration of audio channels are undefined.

A sample_rate_code field is a 3-bit field, which indicates the sample rate of the encoded audio data. Herein, the indication may correspond to one specific sample rate, or may correspond to a set of values that include the sample rate of the encoded audio data as defined in Table A3.3 of ATSC A/52B.

A bit_rate_code field corresponds to a 6-bit field. Herein, among the 6 bits, the lower 5 bits indicate a nominal bit rate. More specifically, when the most significant bit (MSB) is '0', the corresponding bit rate is exact. On the other hand, when the most significant bit (MSB) is '0', the bit rate corresponds to an upper limit as defined in Table A3.4 of ATSC A/53B.

An ISO_639_language_code field is a 24-bit (i.e., 3-byte) field indicating the language used for the audio stream component, in conformance with ISO 639.2/B [x]. When a specific language is not present in the corresponding audio stream component, the value of each byte will be set to '0x00'.

FIG. 19 illustrates an exemplary bit stream syntax structure of an MH RTP payload type descriptor according to the present invention.

The MH_RTP_payload_type descriptor( ) specifies the RTP payload type. Yet, the MH_RTP_payload_type descriptor( ) exists only when the dynamic value of the RTP_payload_type field within the num components loop of the SMT is in the range of '96' to '127'. The MH_RTP_payload_type descriptor( ) is used as a component_level_descriptor of the SMT.

The MH_RTP_payload_type descriptor translates (or matches) a dynamic RTP_payload_type field value into (or with) a MIME type. Accordingly, the receiving system (or receiver) may collect (or gather) the encoding format of the IP stream component, which is encapsulated in RTP.

The fields included in the MH_RTP_payload_type descriptor( ) will now be described in detail.

A descriptor_tag field corresponds to an 8-bit unsigned integer having the value TBD, which identifies the current descriptor as the MH_RTP_payload_type descriptor( ).

A descriptor_length field also corresponds to an 8-bit unsigned integer, which indicates the length (in bytes) of the portion immediately following the descriptor_length field up to the end of the MH_RTP_payload_type descriptor( ).

An RTP_payload_type field corresponds to a 7-bit field, which identifies the encoding format of the IP stream component. Herein, the dynamic value of the RTP_payload_type field is in the range of '96' to '127'.

A MIME_type_length field specifies the length (in bytes) of a MIME_type field.

The MIME_type field indicates the MIME type corresponding to the encoding format of the IP stream component, which is described by the MH_RTP_payload_type descriptor( ).

FIG. 20 illustrates an exemplary bit stream syntax structure of an MH current event descriptor according to the present invention.

The MH_current_event_descriptor( ) shall be used as the virtual_channel_level_descriptor( ) within the SMT. Herein, the MH_current_event_descriptor( ) provides basic information on the current event (e.g., the start time, duration, and title of the current event, etc.), which is transmitted via the respective virtual channel.

The fields included in the MH_current_event_descriptor( ) will now be described in detail.

A descriptor_tag field corresponds to an 8-bit unsigned integer having the value TBD, which identifies the current descriptor as the MH_current_event_descriptor( ).

A descriptor_length field also corresponds to an 8-bit unsigned integer, which indicates the length (in bytes) of the portion immediately following the descriptor_length field up to the end of the MH_current_event_descriptor( ).

A current_event_start_time field corresponds to a 32-bit unsigned integer quantity. The current_event_start_time field represents the start time of the current event and, more specifically, as the number of GPS seconds since 00:00:00 UTC, Jan. 6, 1980.

A current_event_duration field corresponds to a 24-bit field. Herein, the current_event_duration field indicates the duration of the current event in hours, minutes, and seconds (wherein the format is in 6 digits, 4-bit BCD=24 bits).

A title_length field specifies the length (in bytes) of a title_text field. Herein, the value '0' indicates that there are no titles existing for the corresponding event.

The title_text field indicates the title of the corresponding event in event title in the format of a multiple string structure as defined in ATSC A/65C [x].

FIG. 21 illustrates an exemplary bit stream syntax structure of an MH next event descriptor according to the present invention.

The optional MH_next_event_descriptor( ) shall be used as the virtual_channel_level_descriptor( ) within the SMT. Herein, the MH_next_event_descriptor( ) provides basic information on the next event (e.g., the start time, duration, and title of the next event, etc.), which is transmitted via the respective virtual channel.

The fields included in the MH_next_event_descriptor( ) will now be described in detail.

A descriptor_tag field corresponds to an 8-bit unsigned integer having the value TBD, which identifies the current descriptor as the MH_next_event_descriptor( ).

A descriptor_length field also corresponds to an 8-bit unsigned integer, which indicates the length (in bytes) of the portion immediately following the descriptor_length field up to the end of the MH_next_event_descriptor( ).

A next_event_start_time field corresponds to a 32-bit unsigned integer quantity. The next_event_start_time field represents the start time of the next event and, more specifically, as the number of GPS seconds since 00:00:00 UTC, Jan. 6, 1980.

A next_event_duration field corresponds to a 24-bit field. Herein, the next_event_duration field indicates the duration of the next event in hours, minutes, and seconds (wherein the format is in 6 digits, 4-bit BCD=24 bits).

A title_length field specifies the length (in bytes) of a title_text field. Herein, the value '0' indicates that there are no titles existing for the corresponding event.

The title_text field indicates the title of the corresponding event in event title in the format of a multiple string structure as defined in ATSC A/65C [x].

FIG. 22 illustrates an exemplary bit stream syntax structure of an MH system time descriptor according to the present invention.

The MH_system_time_descriptor( ) shall be used as the ensemble_level_descriptor( ) within the SMT. Herein, the MH_system_time_descriptor( ) provides information on current time and date. The MH_system_time_descriptor( ) also provides information on the time zone in which the transmitting system (or transmitter) transmitting the corresponding broadcast stream is located, while taking into consideration the mobile/portable characteristics of the MH service data.

The fields included in the MH_system_time_descriptor( ) will now be described in detail.

A descriptor_tag field corresponds to an 8-bit unsigned integer having the value TBD, which identifies the current descriptor as the MH_system_time_descriptor( ).

A descriptor_length field also corresponds to an 8-bit unsigned integer, which indicates the length (in bytes) of the portion immediately following the descriptor_length field up to the end of the MH_system_time_descriptor( ).

A system_time field corresponds to a 32-bit unsigned integer quantity. The system_time field represents the current system time and, more specifically, as the number of GPS seconds since 00:00:00 UTC, Jan. 6, 1980.

A GPS_UTC_offset field corresponds to an 8-bit unsigned integer, which defines the current offset in whole seconds between GPS and UTC time standards. In order to convert GPS time to UTC time, the GPS_UTC_offset is subtracted from GPS time. Whenever the International Bureau of Weights and Measures decides that the current offset is too far in error, an additional leap second may be added (or subtracted). Accordingly, the GPS_UTC_offset field value will reflect the change.

A time_zone_offset_polarity field is a 1-bit field, which indicates whether the time of the time zone, in which the broadcast station is located, exceeds (or leads or is faster) or falls behind (or lags or is slower) than the UTC time. When the value of the time_zone_offset_polarity field is equal to '0', this indicates that the time on the current time zone exceeds the UTC time. Therefore, a time_zone_offset field value is added to the UTC time value. Conversely, when the value of the time_zone_offset_polarity field is equal to '1', this indicates that the time on the current time zone falls behind the UTC time. Therefore, the time_zone_offset field value is subtracted from the UTC time value.

The time_zone_offset field is a 31-bit unsigned integer quantity. More specifically, the time_zone_offset field represents, in GPS seconds, the time offset of the time zone in which the broadcast station is located, when compared to the UTC time.

A daylight savings field corresponds to a 16-bit field providing information on the Summer Time (i.e., the Daylight Savings Time).

A time_zone field corresponds to a (5×8)-bit field indicating the time zone, in which the transmitting system (or transmitter) transmitting the corresponding broadcast stream is located.

Figure 23:
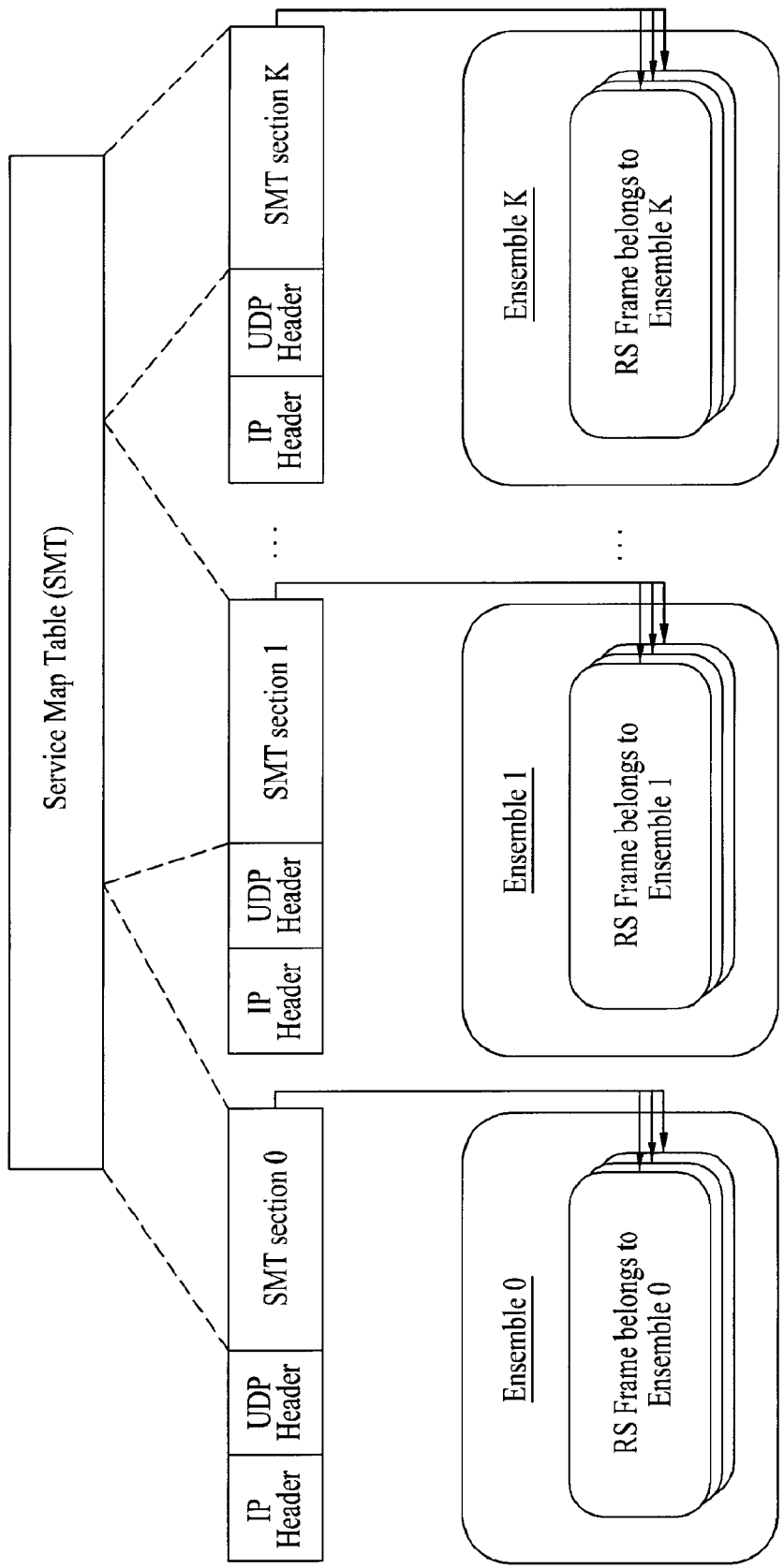
FIG. 23 illustrates segmentation and encapsulation processes of a service map table according to the present invention.

FIG. 23 illustrates segmentation and encapsulation processes of a service map table (SMT) according to the present invention.

According to the present invention, the SMT is encapsulated to UDP, while including a target IP address and a target UDP port number within the IP datagram. More specifically, the SMT is first segmented into a predetermined number of sections, then encapsulated to a UDP header, and finally encapsulated to an IP header.

In addition, the SMT section provides signaling information on all virtual channel included in the MH ensemble including the corresponding SMT section. At least one SMT section describing the MH ensemble is included in each RS frame included in the corresponding MH ensemble. Finally, each SMT section is identified by an ensemble_id included in each section.

According to the embodiment of the present invention, by informing the receiving system of the target IP address and target UDP port number, the corresponding data (i.e., target IP address and target UDP port number) may be parsed without having the receiving system to request for other additional information.

Figure 24:
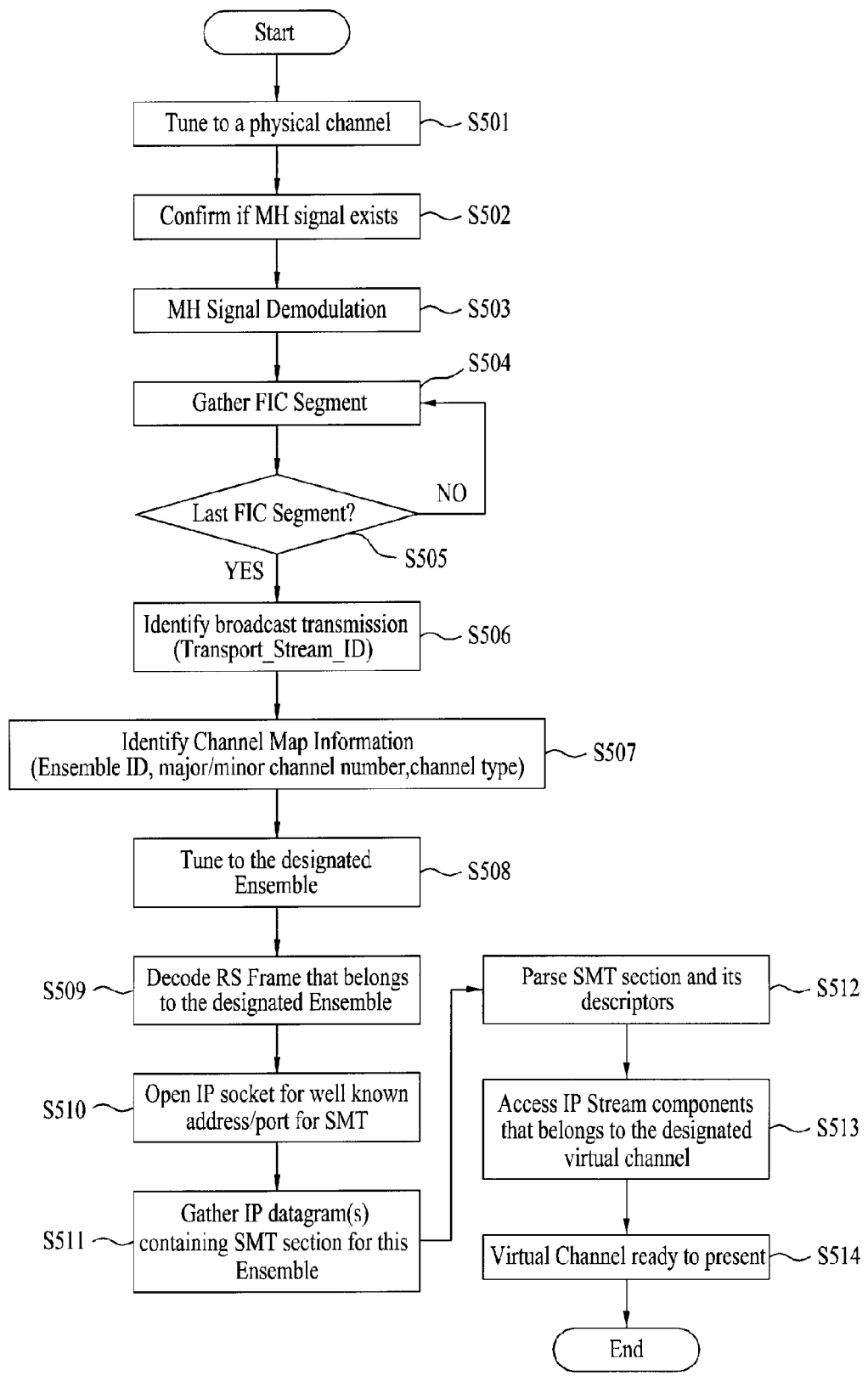
FIG. 24 illustrates a flow chart for accessing a virtual channel using FIC and SMT according to the present invention.

FIG. 24 illustrates a flow chart for accessing a virtual channel using FIC and SMT according to the present invention.

More specifically, a physical channel is tuned (S501). And, when it is determined that an MH signal exists in the tuned physical channel (S502), the corresponding MH signal is demodulated (S503). Additionally, FIC segments are grouped from the demodulated MH signal in sub-frame units (S504 and S505).

According to the embodiment of the present invention, an FIC segment is inserted in a data group, so as to be transmitted. More specifically, the FIC segment corresponding to each data group described service information on the MH ensemble to which the corresponding data group belongs. When the FIC segments are grouped in sub-frame units and, then, deinterleaved, all service information on the physical channel through which the corresponding FIC segment is transmitted may be acquired. Therefore, after the tuning process, the receiving system may acquire channel information on the corresponding physical channel during a sub-frame period. Once the FIC segments are grouped, in S504 and S505, a broadcast stream through which the corresponding FIC segment is being transmitted is identified (S506). For example, the broadcast stream may be identified by parsing the transport_stream_id field of the FIC body, which is configured by grouping the FIC segments.

Furthermore, an ensemble identifier, a major channel number, a minor channel number, channel type information, and so on, are extracted from the FIC body (S507). And, by using the extracted ensemble information, only the slots corresponding to the designated ensemble are acquired by using the time-slicing method, so as to configure an ensemble (S508).

Subsequently, the RS frame corresponding to the designated ensemble is decoded (S509), and an IP socket is opened for SMT reception (S510).

According to the example given in the embodiment of the present invention, the SMT is encapsulated to UDP, while including a target IP address and a target UDP port number within the IP datagram. More specifically, the SMT is first segmented into a predetermined number of sections, then encapsulated to a UDP header, and finally encapsulated to an IP header. According to the embodiment of the present invention, by informing the receiving system of the target IP address and target UDP port number, the receiving system parses the SMT sections and the descriptors of each SMT section without requesting for other additional information (S511).

The SMT section provides signaling information on all virtual channel included in the MH ensemble including the corresponding SMT section. At least one SMT section describing the MH ensemble is included in each RS frame included in the corresponding MH ensemble. Also, each SMT section is identified by an ensemble_id included in each section.

Furthermore each SMT provides IP access information on each virtual channel subordinate to the corresponding MH ensemble including each SMT. Finally, the SMT provides IP stream component level information required for the servicing of the corresponding virtual channel.

Therefore, by using the information parsed from the SMT, the IP stream component belonging to the virtual channel requested for reception may be accessed (S513). Accordingly, the service associated with the corresponding virtual channel is provided to the user (S514).

Meanwhile, the present invention relates to acquiring access information on an IP-based virtual channel service through an SMT and its respective descriptors. Herein, the virtual channel service, mobile service, and MH service are all used in the same meaning.

More specifically, the SMT is included in an RS frame, which transmits mobile service data corresponding to a single MH ensemble, so as to be received. The SMT includes signaling information on the virtual channel and IP-based mobile service, which are included in the MH ensemble, through which the corresponding SMT is transmitted (or delivered). Furthermore, the SMT may include a plurality of descriptors.

The SMT according to an embodiment of the present invention may include a session description protocol (SDP) reference descriptor. And, in this case, the digital broadcast receiving system may recognize (or acknowledge) the corresponding virtual channel as a session and may acquire an SDP message with respect to the corresponding session. More specifically, according to the embodiment of the present invention, when an SDP exists for each virtual channel, the position information of the corresponding SDP message is received through the SDP reference descriptor.

The SMT according to another embodiment of the present invention may include a session description (SD) descriptor. And, in this case, the digital broadcast receiving system may recognize (or acknowledge) the corresponding virtual channel as a session and may acquire IP access information and description information on the corresponding session. More specifically, according to the other embodiment of the present invention, the IP access information and description information corresponding to each stream component for each respective virtual channel may be received through the SD descriptor. The SD descriptor may provide access information for each respective IP media component being transmitted though the corresponding session and access information based upon the corresponding media characteristic. Furthermore, the SD descriptor may also provide Codec information for each component.

Figure 25:
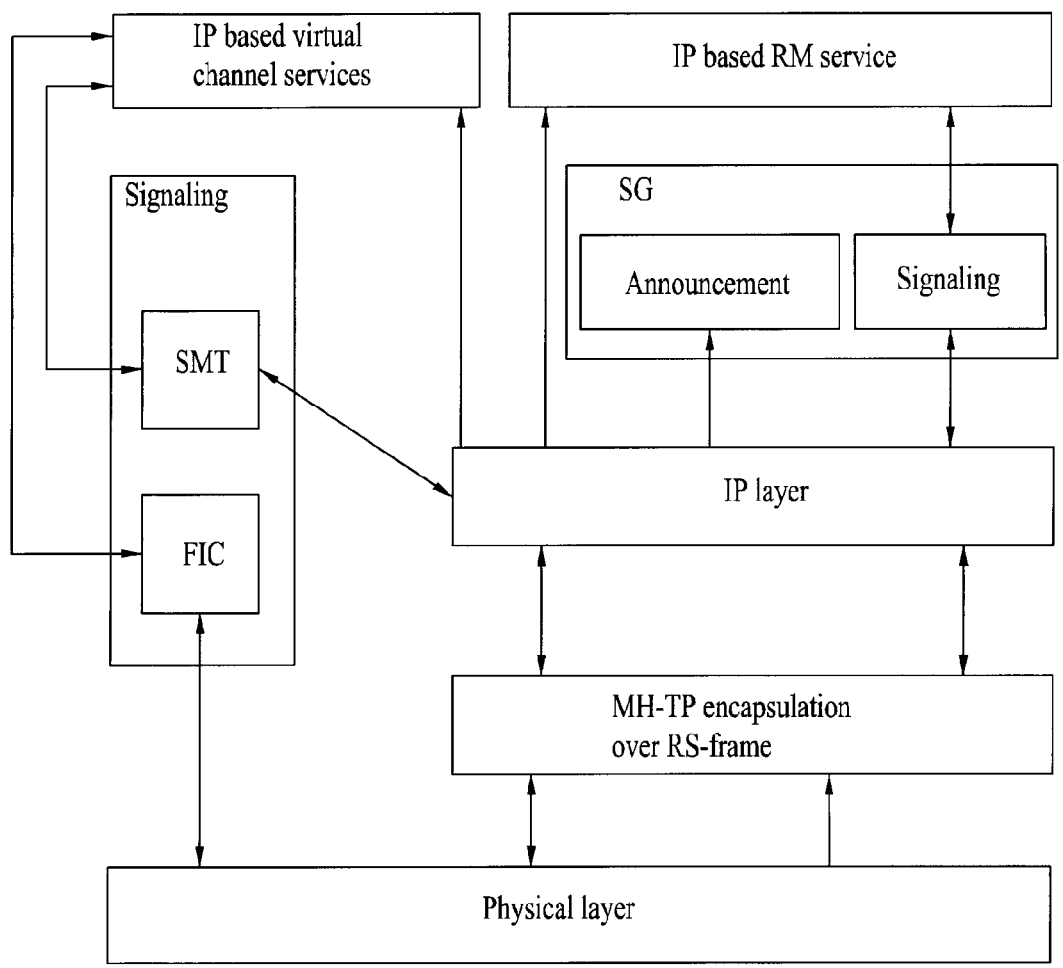
FIG. 25 illustrates an exemplary MH system architecture according to the present invention.

FIG. 25 illustrates an exemplary MH system architecture according to the present invention. Referring to FIG. 25, the system architecture provides IP-based virtual channel service and rich media (RM) services. More specifically, the virtual channel services and RM service IP-packetized in the IP layer are first encapsulated into an MH TP within an RS frame. Thereafter, the encapsulated services are delivered (or transmitted) through a physical layer. At this point, in order to provide and ensure fast channel setting on the IP-based virtual channel service, a 2-step signaling method using FIC and SMT will be used. And, an IP-based signaling method is used for the IP-based services.

Figure 26:
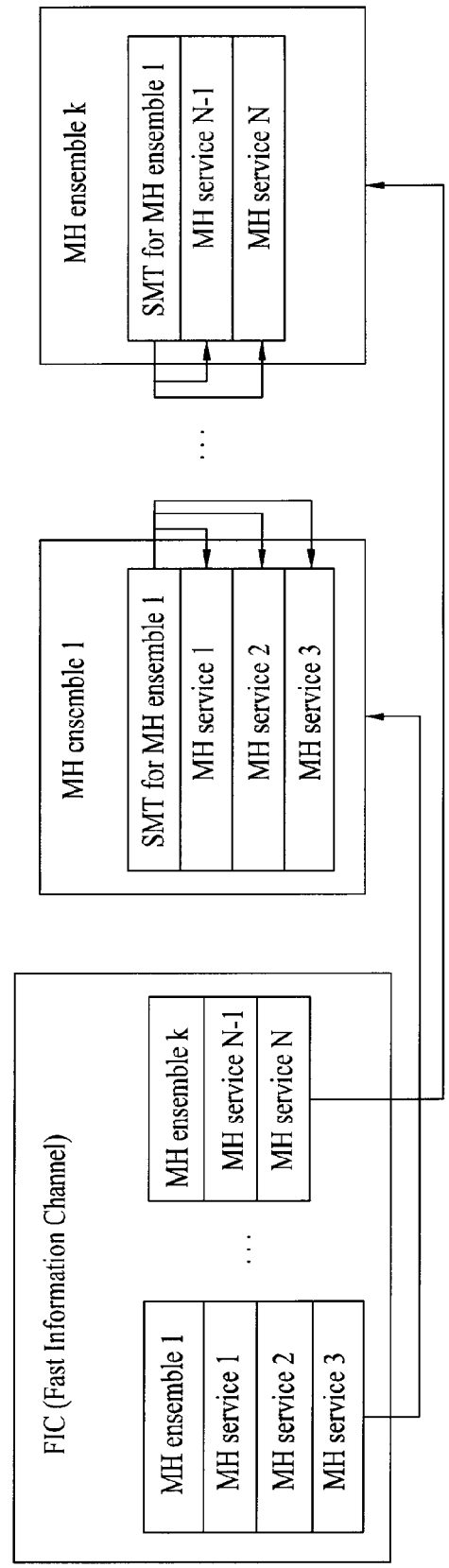
FIG. 26 illustrates a 2-step signaling method using the FIC and SMT according to the present invention.

FIG. 26 illustrates a 2-step signaling method using the FIC and SMT according to the present invention. More specifically, the FIC provides the receiving system with information on the IP-based virtual channel service, more particularly, in which MH ensemble the corresponding IP-based virtual channel service exists. After receiving the corresponding FIC information, the receiving system decodes the RS frame corresponding to the desired (or requested) MH ensemble. Subsequently, the receiving system acquires access information of the IP-based virtual channel service within the corresponding MH ensemble through an SMT included in the decoded RS frame. Herein, the FIC includes information linking the MH ensemble to the virtual channel service. Furthermore, each row of the RS frame configures an MH TP, as shown in FIG. 3. Each MH TP is configured of any one of IP datagrams, signaling data, such as or SMT, and a combination of IP datagrams and signaling data encapsulated therein. If the SMT exists in a well-known position (or pre-arranged position) within the RS frame, the receiving system may be able to process the SMT first when receiving the RS frame.

FIG. 27 illustrates an exemplary bit stream syntax structure of a service map table (SMT) according to another embodiment of the present invention. The SMT shown in FIG. 27 is configured in an MPEG-2 private section format. However, this will not limit the scope of the present invention. The SMT includes description information for each virtual channel within a single MH ensemble. And, other additional information may be included in the Descriptor field. The SMT includes at least one field and is transmitted from the transmitting system (or transmitter) to the receiving system (or receiver). The difference between the SMT shown in FIG. 17 and the SMT shown in FIG. 27 is the presence of IP access information. More specifically, the SMT of FIG. 17 provides IP access information of virtual channels and/or IP access information of IP stream components in a field format. Alternatively, when IP access information of virtual channel or IP stream components are required, the SMT of FIG. 27 may provide the requested information through descriptors within a virtual channel loop.

Also, as described in FIG. 3, the SMT section may be included in an RS frame of the MH TP, which is then transmitted. In this case, each of the RS frame decoders 170 and 180 (shown in FIG. 1) decodes the inputted RS frame, and the decoded RS frame is outputted to each respective RS frame handler 211 and 212. Also, each RS frame handler 211 and 212 distinguishes the inputted RS frame in row units, thereby configuring an MH TP. Then, each RS frame handler 211 and 212 outputs the configured MH TP to the MH TP handler 213.

When the system determines, based upon the header of each received MH TP, that the corresponding MH TP includes an SMT section, the MH TP handler 213 parses the included SMT section. Then, the MH TP handler 213 outputs the SI data included in the parsed SMT section to the physical adaptation control signal handler 216. However, in this case, the SMT is not encapsulated into IP datagrams.

Meanwhile, when the SMT is encapsulated into IP datagrams, and when the system determines, based upon the header of each received MH TP, that the corresponding MH TP includes an SMT section, the MH TP handler 213 outputs the corresponding SMT section to the IP network stack 220. Accordingly, the IP network stack 220 performs IP and UDP processes on the SMT section and outputs the processed SMT section to the SI handler 240. The SI handler 240 parses the inputted SMT section and controls the system so that the parsed SI data are stored in the storage unit 290.

Examples of the fields that can be transmitted through the service map table (SMT) will now be described.

A table_id field corresponds to an 8-bit unsigned integer number, which indicates the type of table section being defined in the SMT.

An ensemble_id field corresponds to an 8-bit unsigned integer field, the value of which ranges from '0x00' to '0x3F'. Herein, the value of the ensemble_id field corresponds to an ID value associated with the corresponding MH ensemble. It is preferable that the value of the ensemble_id field is derived from the parade_id carried from the baseband processor of MH physical layer subsystem. When the corresponding MH ensemble is carried over (or transmitted through) the primary RS frame, the most significant bit (MSB) is set to '0', and the remaining (or least significant) 7 bits are used as identification values (i.e., parade_id) of the corresponding MH ensemble. On the other hand, when the corresponding MH ensemble is carried over (or transmitted through) the secondary RS frame, the most significant bit (MSB) is set to '1', and the remaining (or least significant) 7 bits are used as identification values (i.e., parade_id) of the corresponding MH ensemble.

A num_channels field corresponds to an 8-bit field, which specifies the number of virtual channels in the corresponding SMT section.

Additionally, the SMT uses a 'for' loop statement so as to provide information on a plurality of virtual channels.

A transport_stream_ID field corresponds to a 16-bit field indicating an identification value for distinguishing the corresponding SMT from other SMTs that may be broadcasted via different physical channels.

A major_channel_num field corresponds to an 8-bit unsigned integer field, which represents the major channel number associated with the corresponding virtual channel. Herein, the major_channel_num field is assigned with a value ranging from '0x00' to '0xFF'.

A minor_channel_num field corresponds to an 8-bit unsigned integer field, which represents the minor channel number associated with the corresponding virtual channel. Herein, the minor_channel_num field is assigned with a value ranging from '0x00' to '0xFF'.

A source_id field corresponds to a 16-bit unsigned integer number, which identifies the programming source associated with the virtual channel. Accordingly, a source corresponds to any one specific source of video, text, data, and audio programs. The source_id field is not assigned with the value '0' (i.e., the source_id value zero ('0') is reserved). The source_id field is assigned with a value ranging from '0x0001' to '0x0FFF'. Herein, the source_id field value is a unique value, at the regional level, within the physical channel carrying the SMT.

A short_channel_name field indicates a short textual name of the virtual channel.

Furthermore, the 'for' loop statement may further include a descriptors( ) field. The descriptors( ) field included in the 'for' loop statement corresponds to a descriptor individually applied to each virtual channel. The SDP reference descriptor or SD descriptor according to the present invention may be received by being included in any one of the SMT shown in FIG. 17 and the SMT shown in FIG. 27.

FIG. 28 illustrates an exemplary bit stream syntax structure of an SDP_Reference_Descriptor( ) according to the present invention.

Referring to FIG. 28, a descriptor_tag field is assigned with 8 bits. Herein, the descriptor_tag field indicates that the corresponding descriptor is an SDP_Reference_Descriptor( ).

A descriptor_length field is an 8-bit field, which indicates the length (in bytes) of the portion immediately following the descriptor_length field up to the end of the SDP_Reference_Descriptor( ).

An SDP_Reference_type field corresponds to an indicator indicating whether or not the corresponding SDP message is being transmitted in a session announcement protocol (SAP) stream format, or whether or not the corresponding SDP message is being transmitted in an SDP file format via a file delivery over unidirectional transport (FLUTE) session. More specifically, the SDP message may be received in a stream format and may also be received in a file format. When the SDP message is being received in a stream format, the session announcement protocol (SAP) may be used as the transmission protocol. On the other hand, when the SDP message is being received in a file format, the file delivery over unidirectional transport (FLUTE) protocol may be used as the transmission protocol.

For example, when the SDP_Reference_type field value indicates the SAP stream, the SDP_Reference_Descriptor( ) may include an Address_type field, an Address_count field, a Target_IP_address field, a Target_Port_Num field, a Port_Count field, and a SDP_Session_ID field.

The Address_type field represents an indicator indicating whether the corresponding IP address corresponds to an IPv4 address or an IPv6 address.

The Address_count field indicates the number of IP streams that are transmitted through the corresponding session. The address of each IP stream is assigned with a value increased by '1' starting from the last bit of the Target_IP_address field.

The Target_IP_address field either indicates an IP address of the corresponding IP stream or indicates a representative IP address of the corresponding session.

The Target_Port_Num field either indicates a UDP port number of the corresponding IP stream or indicates a representative UDP port number of the corresponding session.

The Port_Count field indicates the number of port numbers that are transmitted through the corresponding session. The UDP port number of each IP stream is assigned with a value increased by '1' starting from the last bit of the Target_Port_Num field.

Finally, the SDP_Session_ID field represents an identifier assigned to the SDP message respective of the corresponding virtual channel.

Meanwhile, when the SDP_Reference_type field value indicates the FLUTE file delivery, the SDP_Reference_Descriptor( ) may include a TSI_length field, an Address_type field, an Address_count field, a Transport_Session_ID field, a Target_IP_address field, a Target_Port_Num field, a Port_Count field, and an SDP_Session_ID field.

The TSI_length field indicates to which of three options the length of the Transport_Session_ID field corresponds.

The Address_type field represents an indicator indicating whether the corresponding IP address corresponds to an IPv4 address or an IPv6 address.

The Address_count field indicates the number of IP streams that are transmitted through the corresponding session. The address of each IP stream is assigned with a value increased by '1' starting from the last bit of the Target_IP_address field.

The Transport_Session_ID field represents an identifier for an IP address being transmitted (or delivered) to the respective session. Any one of a 16-bit length, a 32-bit length, and a 64-bit length may be optionally assigned as the length of the Transport_Session_ID field.

The Target_IP_address field either indicates an IP address of the corresponding IP stream or indicates a representative IP address of the corresponding session.

The Target_Port_Num field either indicates a UDP port number of the corresponding IP stream or indicates a representative UDP port number of the corresponding session.

The Port_Count field indicates the number of port numbers that are transmitted through the corresponding session. The UDP port number of each IP stream is assigned with a value increased by '1' starting from the last bit of the Target_Port_Num field.

Finally, the SDP_Session_ID field represents an identifier assigned to the SDP message respective of the corresponding virtual channel. More specifically, when an SDP message exists for each virtual channel, the receiving system may be informed of the location information of a corresponding SDP message through the SDP reference descriptor, thereby enabling the receiving system to acquire the SDP message.

FIG. 29 illustrates an exemplary bit stream syntax structure of a Session_Description_Descriptor( ) according to the present invention.

Referring to FIG. 29, a descriptor_tag field is assigned with 8 bits. Herein, the descriptor_tag field indicates that the corresponding descriptor is a Session_Description_Descriptor( ) (i.e., SD descriptor).

A descriptor_length field is an 8-bit field, which indicates the length (in bytes) of the portion immediately following the descriptor_length field up to the end of the Session_Description_Descriptor( ).

A Session_version field indicates the version of the corresponding session.

An Address_type field represents an indicator indicating whether the corresponding IP address corresponds to an IPv4 address or an IPv6 address.

A Target_IP_address field either indicates an IP address of the corresponding IP stream or indicates a representative IP address of the corresponding session.

An Address_count field indicates the number of IP streams that are transmitted through the corresponding session. The address of each IP stream is assigned with a value increased by '1' starting from the last bit of the Target_IP_address field.

A Num_components field indicates the number of components included in the corresponding virtual channel.

The SD descriptor (i.e., Session_Description_Descriptor( )) uses a 'for' loop statement so as to provide information on a plurality of components.

Herein, the 'for' loop statement may includes a Media_type field, a Num_Ports field, a Target_Port_Num field, an RTP_payload_type field, a Codec_type field, and an MPEG4_ES_ID field.

The Media_type field indicates the media type of the corresponding component. For example, the Media_type field indicates whether the component corresponds to audio-type media, video-type media, or data-type media.

The Num_ports field indicates the number of ports transmitting (or delivering) the corresponding component.

The Target_Port_Num field indicates the UDP port number of the corresponding component.

The RTP_payload_type field represents the coding format of the corresponding. In case the corresponding component has not been encapsulated to RTP, the RTP_payload_type field shall be disregarded.

The Codec_type field indicates to which Codec_type the corresponding component has been encoded. For example, if the component corresponds to video-type media, H.264 or SVC may be used as the Codec type of the video component.

The MPEG4_ES_ID field represents an identifier that can identify an MPEG4 element stream (ES) of the corresponding component.

When the Media_type field value indicates video-type media, and when the codec_type field value indicates the H.264, the Session_Description_Descriptor( ) may further include an AVC_Video_Description_Bytes( ) field.

Also, when the Media_type field value indicates video-type media, and when the codec_type field value indicates the SVC, the Session_Description_Descriptor( ) may further include an AVC_Video_Description_Bytes( ) field, a Hierarchy_Description_Bytes( ) field, and an SVC_extension_Description_Bytes( ) field.

Moreover, when the Media_type field value indicates audio-type media, the Session_Description_Descriptor( ) may further include an MPEG4_Audio_Description_Bytes( ) field.

The above-described AVC_Video_Description_Bytes( ) field, the Hierarchy_Description_Bytes( ) field, the SVC_extension_Description_Bytes( ) field, and the MPEG4_Audio_Description_Bytes( ) field respectively include parameters that are used when decoding the corresponding component.

FIG. 30 illustrates an exemplary bit stream syntax structure of an AVC_Video_Description_Bytes( ) according to the present invention. The AVC_Video_Description_Bytes( ) may include a profile_idc field, a constraint_set0_flag field, a constraint_set1_flag field, a constraint_set2_flag field, a constraint_set3_flag field, an AVC compatible flags field, a level_idc field, an AVC still present field, and an AVC 24 hour picture flag field.

More specifically, the profile_idc field indicates a profile of the corresponding video. The constraint_set0_flag to constraint_set3_flag fields respectively indicate a satisfaction status of the constraint respective of the corresponding profile.

The level_idc field indicates the level of the corresponding video. For example, the level_idc field defined in ISO/IEC 14496-10 may be used without modification as the level_idc field included in AVC_Video_Description_Bytes( ) according to the embodiment of the present invention.

FIG. 31 illustrates an exemplary bit stream syntax structure of a Hierarchy_Description_Bytes( ) according to the present invention. The Hierarchy_Description_Bytes( ) may include a temporal_scalability_flag field, a spatial_scalability_flag field, a quality_scalability_flag field, a hierarchy_type field, a hierarchy_layer_index field, a hierarchy_embedded_layer_index field, and a hierarchy channel field. More specifically, the temporal_scalability_flag field indicates a temporal scalability status of the corresponding video.

The spatial_scalability_flag field indicates a spatial scalability status of the corresponding video. And, the quality_scalability_flag field indicates a qualitative scalability status of the corresponding video.

FIG. 32 illustrates an exemplary bit stream syntax structure of an SVC_extension_Description_Bytes( ) according to the present invention. Herein, the SVC_extension_Description_Bytes( ) may include a profile_idc field, a level_idc field, a width field, a height field, a frame_rate field, an average_bitrate field, a maximum_bitrate field, a dependency_id field, a quality_id_start field, a quality_id_end field, a temporal_id_start field, and a temporal_id_end field.

More specifically, the profile_idc field indicates a profile of the corresponding video.

The level_idc field indicates the level of the corresponding video.

The width field indicates the horizontal size (i.e., width) of the screen on which the corresponding video is to be displayed.

The height field indicates the vertical size (i.e., height) of the screen on which the corresponding video is to be displayed.

The frame_rate field indicates a frame_rate of the corresponding video.

The average_bitrate field indicates the average bit transmission rate of the corresponding video.

And, the maximum_bitrate field indicates the maximum bit transmission rate of the corresponding video.

FIG. 33 illustrates an exemplary bit stream syntax structure of an MPEG4_Audio_Description_Bytes( ) according to the present invention. The MPEG4_Audio_Description_Bytes( ) may include an MPEG4_audio_profile_and_level field.

Herein, the MPEG4_audio_profile_and_level field indicates a profile and a level value of the corresponding audio.

By receiving the SD descriptor included in the SMT, and by using the received SD descriptor, the receiving system according to the present invention may acquire description information including IP access information and Codec information on each component for each respective virtual channel. If the received SD descriptor is included in the SMT shown in FIG. 17, then the IP access information for a corresponding component may be omitted from the SD descriptor.

As described above, the description information on each component (i.e., Codec information) may be received by being included in the SMT shown in FIG. 17 as the component level descriptor. Alternatively, the description information on each component (i.e., Codec information) may be described in the SD descriptor in a text format, and the SD descriptor may be received by being included either in the SMT shown in FIG. 17 or in the SMT shown in FIG. 27 as the virtual channel level descriptor.

If the description information on each component (i.e., Codec information) is received by being included in the SMT of FIG. 17 as the component level descriptor, the description information would be more effective in describing the Codec information of the component, which is encoded in a Codec pre-decided by a specific standard. On the other hand, if the description information on each component (i.e., Codec information) is described in the SD descriptor in a text format, and if the SD descriptor is received by being included either in the SMT of FIG. 17 or in the SMT of FIG. 27 as the virtual channel level descriptor, the description information would be more effective in describing the Codec information of the component, which is encoded in an undecided Codec.

Since the value of each field is pre-decided, the former case is advantageous in that the descriptor size is small and the processing is simplified. However, the disadvantage of the former case is that only the information of the pre-decided Codec can be described. Alternatively, since the Codec information is provided in a text format via the SD descriptor, the latter case is disadvantageous in that the descriptor size for the Codec information may become larger. However, the latter case has an advantage in expandability, since the information may be described even though the corresponding component is coded in an undecided Codec.

An example of accessing the SDP message by referring to the SDP descriptor or the SD descriptor, so as to acquire SDP message information will now be described in detail. For example, it is assumed that the SMT is encapsulated into IP datagrams, so as to be received. Accordingly, when the system determines, based upon the header of each received MH TP, that the corresponding MH TP includes an SMT section, the MH TP handler 213 outputs the corresponding SMT section to the IP network stack 220. Thereafter, the IP network stack 220 performs IP and UDP processes on the SMT section and outputs the processed SMT section to the SI handler 240. The SI handler 240 parses the inputted SMT section and controls the system so that the parsed SI data are stored in the storage unit 290.

At this point, when an SDP reference descriptor (shown in FIG. 28) is included in the SMT section, the SI handler 240 acquires position information of the corresponding SDP message from the SDP reference descriptor. Among the position information, the SI handler 240 may use the SDP reference type information to determine whether the corresponding SDP message is being received in an SAP stream format, or whether the corresponding SDP message is being received in an SDP file format through a FLUTE session. If it is determined that the SDP message is being received in an SAP stream format, the SI handler 240 parses the value of each of the Address_type field, the Address_count field, the Target_I-P_address field, the Target_Port_Num field, the Port_Count field, and the SDP_Session_ID field, which are all included in the descriptor. Then, the SI handler 240 refers to the parsed values to access the corresponding SAP stream, which is then outputted to the MIME handler 260. Thereafter, the MIME handler 260 gathers (or collects) SDP message information from the inputted SAP stream, thereby storing the gathered (or collected) SDP message information in the storage unit 290 through the SI handler 240.

Alternatively, if it is determined that the SDP message is being received in an SDP file format through a FLUTE session, the SI handler 240 parses the value of each of the TSI_length field, the Address_type field, the Address_count field, the Transport_Session_ID field, the Target_IP_address field, the target_Port_Num field, the Port_Count field, and the SDP_Session_ID field, which are all included in the descriptor. Then, the SI handler 240 refers to the parsed values to access the corresponding FLUTE session, which is then outputted to the FLUTE handler 250. The FLUTE handler 250 extracts the SDP file from the inputted FLUTE session, which is then outputted to the MIME handler 260. The MIME handler 260 gathers SDP message information from the inputted SDP file, thereby storing the gathered SDP message information in the storage unit 290 through the SI handler 240.

Meanwhile, when an SD descriptor (shown in FIG. 29) is included in the SMT section, the SI handler 240 acquires IP access information and description information on each component within the corresponding virtual channel from the SD descriptor. For example, the SI handler 240 extracts media-type information and Codec-type information from the SD descriptor. Then, the SI handler 240 acquires Codec information of the corresponding component based upon the extracted media-type information and Codec-type information. The acquired Codec information is then stored in the storage unit 290. When required, however, the acquired Codec information is outputted to the A/V decoder 310.

If the media type corresponds to a video component, and if the Codec type corresponds to H.264, the SI handler 240 parses the AVC_Video_Description_Bytes( ) thereby acquiring the Codec information of the corresponding video component.

Meanwhile, if the media type corresponds to a video component, and if the Codec type corresponds to SVC, the SI handler 240 parses the AVC_Video_Description_Bytes( ) the Hierarchy_Description_Bytes( ) and the SVC_extension_Description_Bytes( ) thereby acquiring the Codec information of the corresponding video component. Furthermore, if the media type corresponds to an audio component, the SI handler 240 parses the MPEG4_Audio_Description_Bytes( ) thereby extracting the Codec information of the corresponding audio component.

Figure 34:
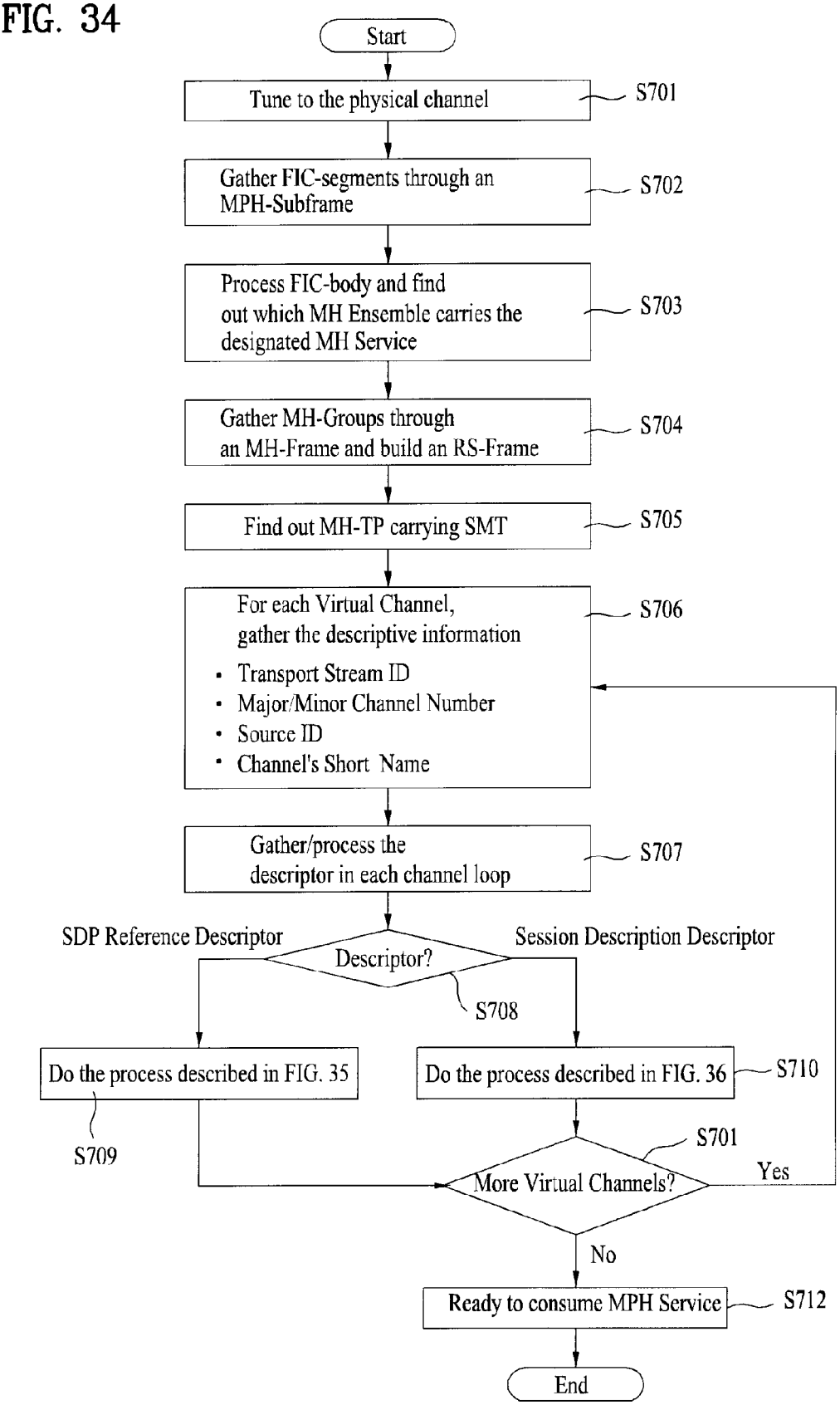
FIG. 34 to FIG. 36 illustrate a flow chart showing a method for accessing mobile services according to an embodiment of the present invention.
Figure 35:
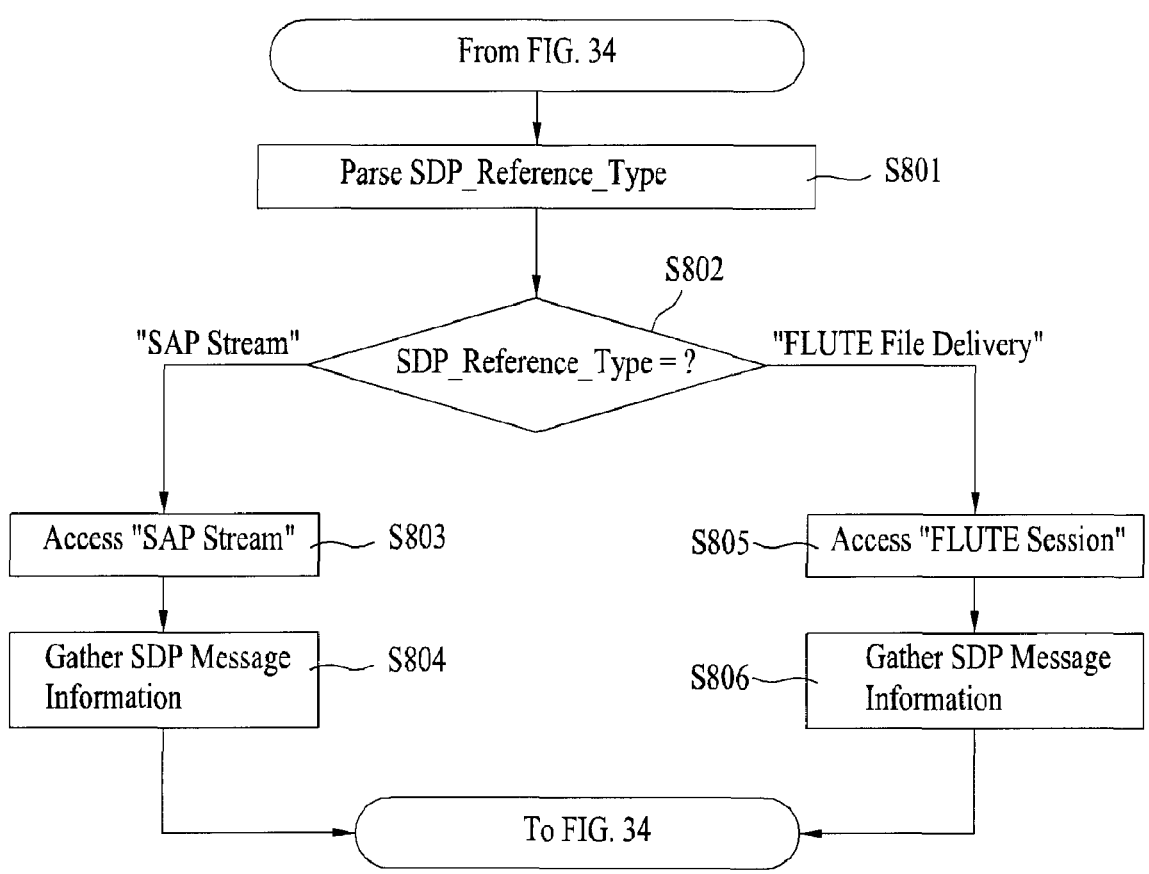
Figure 36:
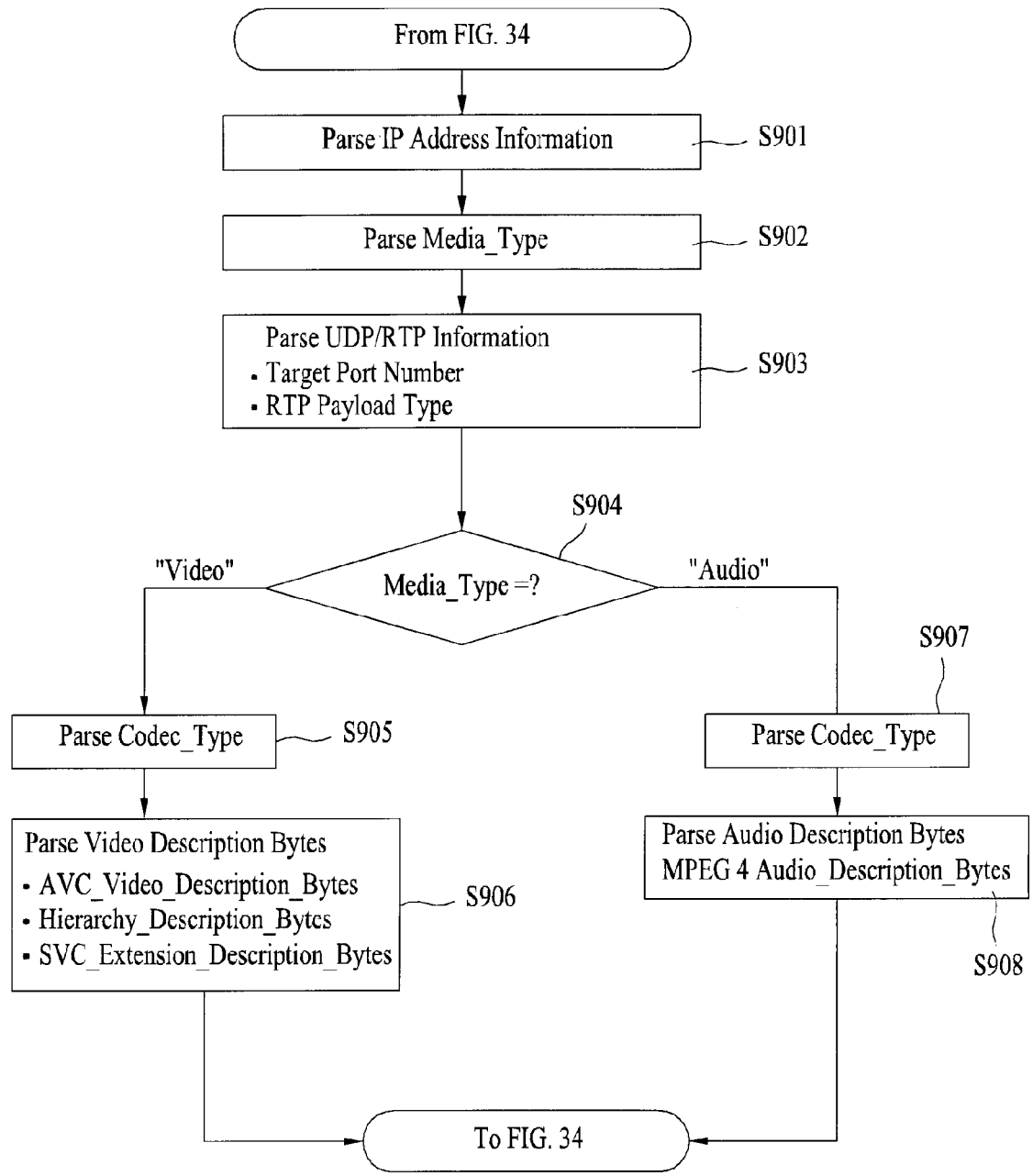

FIG. 34 to FIG. 36 illustrate flow charts showing a method for accessing a mobile service according to an embodiment of the present invention. FIG. 34 illustrates an example of a method for accessing a mobile service using one of the SDP reference descriptor and SD descriptor in the receiving system according to the present invention. More specifically, a physical channel is tuned (S701). And, FIC segments are gathered in sub-frame units through an MH sub-frame of the tuned MH signal, so as to be demodulated (S702). According to the embodiment of the present invention, an FIC segment is inserted in a data group, so as to be transmitted. More specifically, the FIC segment corresponding to each data group described service information on the MH ensemble to which the corresponding data group belongs. When the FIC segments are gathered (or grouped) in sub-frame units and, then, deinterleaved, all service information on the physical channel through which the corresponding FIC segment is transmitted may be acquired. Therefore, after the tuning process, the receiving system may acquire channel information on the corresponding physical channel during a sub-frame period.

In Step 702, when the FIC data are processed, reference may be made to the processed FIC data, so as to locate (or detect) the MH ensemble transmitting the requested mobile service (S703). Then, data groups including the MH ensemble are gathered from the MH frame, so as to configure an RS frame corresponding to the MH ensemble, thereby decoding the configured RS frame (S704). Thereafter, an MH TP, which transmits an SMT from the decoded RS frame, is located (or found) (S705). Each field of the SMT found in Step 705 is parsed, so as to gather descriptive information on each virtual channel (S706).

If the SMT corresponds to the SMT of FIG. 17, the descriptive information may correspond to a major channel number, a minor channel number, a virtual channel short name, service ID, service type, activity status information on the corresponding virtual channel, IP address information, UDP port information, and so on. Alternatively, if the SMT corresponds to the SMT of FIG. 27, the descriptive information may correspond to a transport stream ID, a major channel number, a minor channel number, a source ID, a channel short name, and so on.

Once the descriptive information is gathered, the descriptors within the virtual channel loop of the SMT are gathered and processed (S707). At this point, the system determines whether an SDP reference descriptor (as shown in FIG. 28) or an SD descriptor (as shown in FIG. 29) is included in the descriptors within the virtual channel loop of the SMT (S708). If the system determines, in Step 708, that the SDP reference descriptor is included in the virtual channel loop of the SMT, the process step moves on to the steps shown in FIG. 35, thereby acquiring position information of the corresponding SDP message from the SDP reference descriptor (S709).

Alternatively, if the system determines, in Step 708, that the SD descriptor is included in the virtual channel loop of the SMT, the process step moves on to the steps shown in FIG. 36, thereby acquiring IP access information and description information for each component of the corresponding virtual channel from the SD descriptor (S710). After processing Steps 709 and 710, the system verifies for any remaining unprocessed virtual channels (S711). If the system detects unprocessed virtual channels, Step 706 is repeated so as to gather more information on the corresponding virtual channel. Conversely, if the system does not detect any unprocessed virtual channels, the system prepares to provide the mobile service (S712).

When it is determined in FIG. 34 that an SDP reference descriptor is included in the parsed SMT, FIG. 35 illustrates a flow chart of a method for acquiring position information of the corresponding SDP message. More specifically, the receiving system extracts SDP reference type information from the SDP reference descriptor (S801). Then, it is determined whether the extracted SDP reference type information is being received in an SAP stream format, or whether the extracted SDP reference type information is being received in an SDP file format through a FLUTE session (S802).

If the system determines, in Step 802, that the extracted SDP reference type information is being received in an SAP stream format, the value of each of the Address_type field, the Address_count field, the Target_IP_address field, the Target_Port_Num field, the Port_Count field, and the SDP_Session_ID field, which are all included in the descriptor, is parsed. And, the system refers to the parsed field values to access the corresponding SAP stream (S803). Then, the system gathers SDP message information from the accessed SAP stream, so as to provide the information to the respective block, thereby moving on to the subsequent process steps shown in FIG. 34 (S804).

On the other hand, if the system determines, in Step 802, that the extracted SDP reference type information is being received in an SDP file format through a FLUTE session, the value of each of the TSI_length field, the Address_type field, the Address_count field, the Transport_Session_ID field, the Target_IP_address field, the target_Port_Num field, the Port_Count field, and the SDP_Session_ID field, which are all included in the descriptor, is parsed. And, the system refers to the parsed field values to access the corresponding FLUTE session (S805). Then, the system gathers SDP message information from the accessed FLUTE session, so as to provide the information to the respective block, thereby moving on to the subsequent process steps shown in FIG. 34 (S806).

When it is determined in FIG. 34 that an SD descriptor is included in the parsed SMT, FIG. 35 illustrates a flow chart of a method for acquiring IP access information and description information on each component within the corresponding virtual channel. More specifically, IP address information is extracted from the SD descriptor (S901). Herein, the IP address information may be acquired by parsing the Session_version field, the Address_type field, the Target_IP_address field, and the Address_count field. Then, with respect to each component within the virtual channel, media type information (Media_type) is extracted from the SD descriptor (S902), and UDP/RTP information is extracted from the SD descriptor (S903). Herein, the UDP/RTP information may be acquired by parsing the Num_Ports field, the Target_Port_Num field, and the RTP_payload_type field.

Subsequently, the receiving system determines whether the media type extracted in Step 902 corresponds to a video component or an audio component (S904). When it is verified in Step 904 that the media type corresponds to a video component, Codec type (codec_type) information is extracted (S905). Thereafter, Codec information of the corresponding video component is acquired based upon the extracted Codec type (S906). For example, when the Codec_type indicates H.264, the receiving system parses the AVC_Video_Description_Bytes( ). Meanwhile, when the Codec type indicates SVC, the receiving system parses the AVC_Video_Description_Bytes( ) the Hierarchy_Description_Bytes( ) and the SVC_extension_Description_Bytes( ) thereby acquiring Codec information of the corresponding video component (S906). Thereafter, the acquired video Codec information is outputted to the A/V decoder 310.

Alternatively, when it is verified in Step 904 that the media type corresponds to an audio component, Codec type (codec_type) information is extracted (S907). Then, the receiving system parses the MPEG4_Audio_Description_Bytes( ) thereby extracting the Codec information of the corresponding audio component (S908). Thereafter, the acquired audio Codec information is also outputted to the A/V decoder 310. Based upon the Codec information of the inputted video and/or audio component(s), the A/V decoder 310 decodes audio and/or video stream(s) outputted from the stream handler 230, thereby outputted the decoded stream(s) to the display module 320.

As described above, the digital broadcasting system and the data processing method according to the present invention have the following advantages. By using the SMT, the present invention may perform channel setting more quickly and efficiently. Also, either by including an SDP reference descriptor describing position information on an SDP message in the SMT, or by including an SD descriptor describing IP access information and description information on each component of the respective virtual channel, so as to be transmitted, the present invention may expand information associated with channel settings.

Also, the present invention reduces the absolute amount of acquisition data for channel setting and IP service access, thereby minimizing bandwidth consumption. For example, when the SDP reference descriptor is included in the SMT and received, the corresponding virtual channel is recognized as a session, and the SDP message of the corresponding session may be received. Also, when the SD descriptor is included in the SMT and received, the corresponding virtual channel is recognized as a session, thereby enabling access information based upon the access information and media characteristics of each IP media component, which is being transmitted through the corresponding session.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of processing broadcast data in a broadcast receiving system, the method comprising:
   receiving, by a tuner, a broadcast signal comprising mobile service data, known data sequences, fast information channel (FIC) data and transmission parameter channel (TPC) data;
   demodulating, by a demodulator, the received broadcast signal;
   compensating, by an equalizer, a channel distortion of the demodulated broadcast signal; and
   decoding a Reed-Solomon (RS) frame including mobile service data in the channel distortion compensated broadcast signal,
   wherein the RS frame belongs to one of a primary ensemble and a secondary ensemble, wherein the FIC data includes information for rapid mobile service acquisition, wherein the TPC data includes version information for indicating an update of the FIC data and a parade identifier for identifying a parade which carries at least one of the primary ensemble and the secondary ensemble, wherein the primary ensemble includes a first service map table and the secondary ensemble includes a second service map table, wherein the first service map table comprises a first ensemble identifier to identify the primary ensemble and the second service map table comprises a second ensemble identifier to identify the secondary ensemble, and wherein the first and second ensemble identifiers include the parade identifier, respectively.

2. The method of claim 1, wherein a most significant bit of the first ensemble identifier is set to 0.

3. The method of claim 1, wherein a most significant bit of the second ensemble identifier is set to 1.

4. The method of claim 1, wherein a least significant 7 bits of the first ensemble identifier correspond to the parade identifier.

5. The method of claim 1, wherein a least significant 7 bits of the second ensemble identifier correspond to the parade identifier.

6. A broadcast receiving system comprising:
a tuner for receiving a broadcast signal comprising mobile service data, known data sequences, fast information channel (FIC) data, and transmission parameter channel (TPC) data;
a demodulator for demodulating the received broadcast signal;
an equalizer for compensating a channel distortion of the demodulated broadcast signal; and
a Reed-Solomon (RS) frame decoder for decoding an RS frame including mobile service data in the channel distortion compensated broadcast signal,
wherein the RS frame belongs to one of a primary ensemble and a secondary ensemble, wherein the FIC data includes information for rapid mobile service acquisition, wherein the TPC data includes version information for indicating an update of the FIC data and a parade identifier for identifying a parade which carries at least one of the primary ensemble and the secondary ensemble,
wherein the primary ensemble includes a first service map table and the secondary ensemble includes a second service map table,
wherein the first service map table comprises a first ensemble identifier to identify the primary ensemble and the second service map table comprises a second ensemble identifier to identify the secondary ensemble, and
wherein the first and second ensemble identifiers include the parade identifier, respectively.

7. The broadcast receiving system of claim 6, wherein a most significant bit of the first ensemble identifier is set to 0.

8. The broadcast receiving system of claim 6, wherein a most significant bit of the second ensemble identifier is set to 1.

9. The broadcast receiving system of claim 6, wherein a least significant 7 bits of the first ensemble identifier correspond to the parade identifier.

10. The broadcast receiving system of claim 6, wherein a least significant 7 bits of the second ensemble identifier correspond to the parade identifier.

* * * * *